United States Patent
Li et al.

(10) Patent No.: US 11,415,743 B2
(45) Date of Patent: Aug. 16, 2022

(54) MULTICORE FIBER WITH EXTERIOR CLADDING REGION

(71) Applicant: CORNING INCORPORATED, Corning, NY (US)

(72) Inventors: Ming-Jun Li, Horseheads, NY (US); Gaozhu Peng, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/190,991

(22) Filed: Mar. 3, 2021

(65) Prior Publication Data
US 2021/0294024 A1    Sep. 23, 2021

Related U.S. Application Data

(60) Provisional application No. 62/991,898, filed on Mar. 19, 2020.

(51) Int. Cl.
  *G02B 6/02* (2006.01)
  *G02B 6/028* (2006.01)
  *G02B 6/036* (2006.01)

(52) U.S. Cl.
  CPC ..... *G02B 6/02042* (2013.01); *G02B 6/02004* (2013.01); *G02B 6/028* (2013.01); *G02B 6/036* (2013.01); *G02B 6/03644* (2013.01); *G02B 6/03672* (2013.01)

(58) Field of Classification Search
  CPC ........... G02B 6/02004; G02B 6/02042; G02B 6/028; G02B 6/036; G02B 6/03644; G02B 6/03672
  See application file for complete search history.

(56) References Cited

U.S. PATENT DOCUMENTS

| | | | | |
|---|---|---|---|---|
| 8,285,094 B2* | 10/2012 | Takenaga | ........... | G02B 6/02042 385/100 |
| 8,447,156 B2* | 5/2013 | Sasaoka | ............... | G02B 6/0365 385/127 |
| 8,737,792 B2* | 5/2014 | Fini | ..................... | G02B 6/02042 385/127 |
| 8,737,793 B2* | 5/2014 | Imamura | .............. | G02B 6/0365 385/126 |

(Continued)

OTHER PUBLICATIONS

Hayashi et al., "125-μm-Cladding Eight-Core Multi-Core Fiber Realizing Ultra-High-Density Cable Suitable for O-Band Short-Reach Optical Interconnects," Journal of Lightwave Technology, vol. 34, No. 1, Jan. 2016, pp. 85-92.

(Continued)

*Primary Examiner* — Ryan A Lepisto
(74) *Attorney, Agent, or Firm* — Kevin L. Bray

(57) ABSTRACT

A multicore optical fiber includes two or more cores, a common interior cladding surrounding the two or more cores, and a common exterior cladding surrounding the common interior cladding. The common exterior cladding has a lower relative refractive index than the common interior cladding and reduces tunneling losses from the cores. The reduced tunneling loss allows placement of cores closer to the edge of the fiber, thus providing multicore optical fibers having higher core count for a given fiber diameter. Separation between cores is controlled to minimize crosstalk.

20 Claims, 8 Drawing Sheets

(56) References Cited

U.S. PATENT DOCUMENTS

| | | | | |
|---|---|---|---|---|
| 8,965,165 | B2* | 2/2015 | Sasaki | G02B 6/02042 385/126 |
| 8,971,685 | B2* | 3/2015 | Matsuo | G02B 6/0365 385/127 |
| 9,008,479 | B2* | 4/2015 | Tanigawa | G02B 6/02042 385/126 |
| 9,081,129 | B2* | 7/2015 | Matsuo | G02B 6/02042 |
| 9,086,519 | B2* | 7/2015 | Arakawa | G02B 6/02042 |
| 9,164,228 | B2* | 10/2015 | Hayashi | G02B 6/4401 |
| 9,199,411 | B2* | 12/2015 | Arakawa | B29C 65/02 |
| 9,291,768 | B2* | 3/2016 | Ishida | G02B 6/02042 |
| 9,400,351 | B2* | 7/2016 | Takenage | G02B 6/03605 |
| 9,405,060 | B2* | 8/2016 | Ishida | G02B 6/02042 |
| 9,470,841 | B2* | 10/2016 | Bickham | G02B 6/03633 |
| 9,529,144 | B2* | 12/2016 | Ishida | G02B 6/02 |
| 9,529,146 | B2* | 12/2016 | Ishida | G02B 6/02042 |
| 9,557,476 | B2* | 1/2017 | Matsuo | G02B 6/02042 |
| 9,574,911 | B2* | 2/2017 | Hoover | G01D 5/268 |
| 9,588,284 | B2* | 3/2017 | Sasaki | G02B 6/02219 |
| 9,726,816 | B2* | 8/2017 | Hayashi | G02B 6/3863 |
| 10,310,176 | B2* | 6/2019 | Sasaki | G02B 6/02042 |
| 2012/0134637 | A1* | 5/2012 | Imamura | G02B 6/0365 385/127 |
| 2013/0251320 | A1 | 9/2013 | Hayashi | |
| 2014/0178024 | A1* | 6/2014 | Takenaga | G02B 6/02042 385/126 |
| 2014/0334789 | A1 | 11/2014 | Matsuo et al. | |
| 2017/0363508 | A1 | 12/2017 | Hayashi et al. | |
| 2021/0003773 | A1* | 1/2021 | Hayashi | G02B 6/036 |

OTHER PUBLICATIONS

Hayashi et al., "Design and fabrication of ultra-low crosstalk and low-loss multi-core fiber," Opt. Express, vol. 19, No. 17, Aug. 2011, pp. 16576-16592.

Sasaki et al., "Single-Mode 37-Core Fiber with a Cladding Diameter of 248 μm," in Optical Fiber Communication Conference, OSA Technical Digest (online) (Optical Society of America, 2017), paper Th1H.2.

T. Hayashi et al., "End-to-End Multi-Core Fibre Transmission Link Enabled by Silicon Photonics Transceiver with Grating Coupler Array," in Eur. Conf. Opt. Commun. (ECOC), Gothenburg, 2017, p. Th.2.A.4, pp. 3.

International Search Report and Written Opinion of the International Searching Authority; PCT/US2021/020213/05888; dated May 27, 2021; 10 pages; European Patent Office.

* cited by examiner

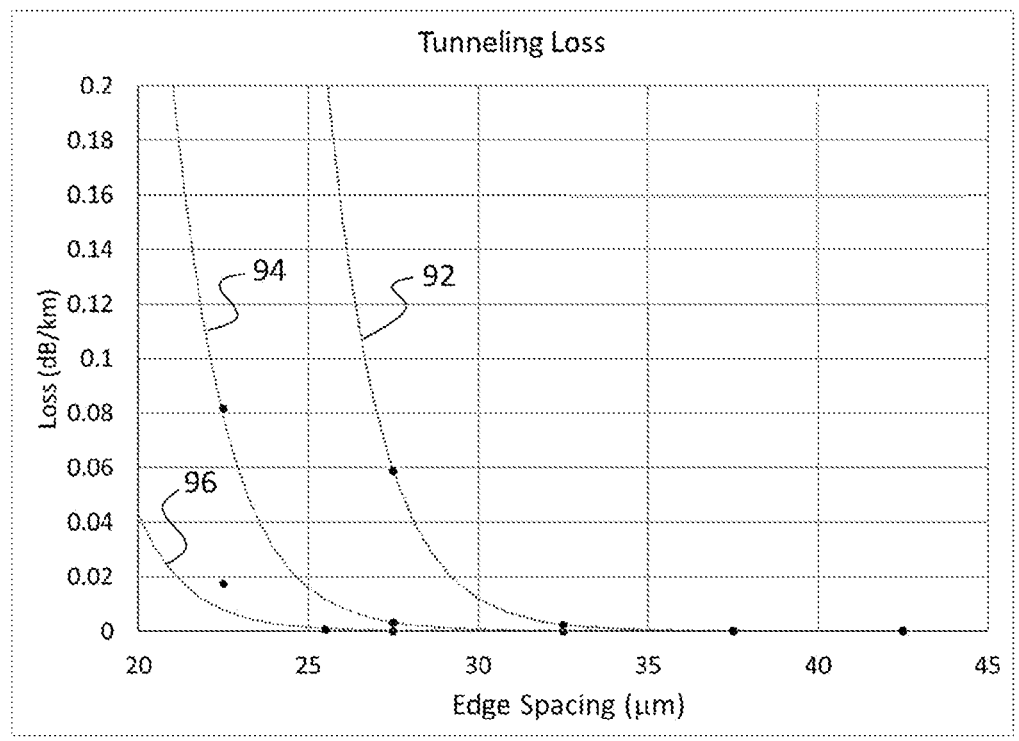
FIG. 12
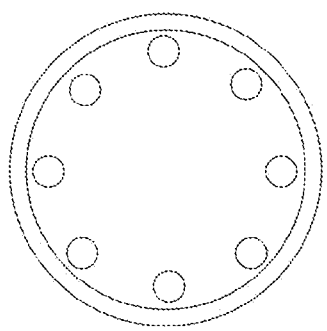
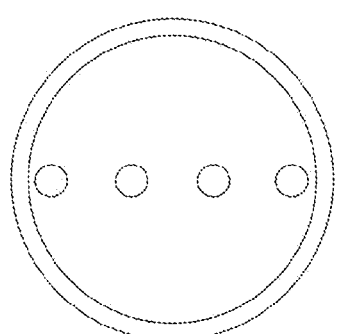
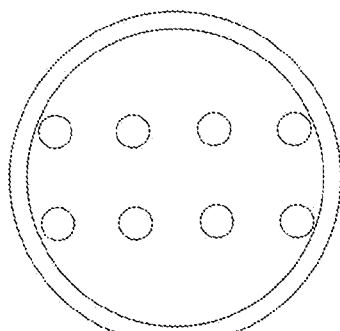
FIG. 13  FIG. 14  FIG. 15

MULTICORE FIBER WITH EXTERIOR CLADDING REGION

This application claims the benefit of priority from U.S. Provisional Patent Application Ser. No. 62/991,898 filed on Mar. 19, 2020, the content of which is relied upon and incorporated herein by reference in its entirety.

FIELD OF THE DISCLOSURE

This disclosure pertains to optical fibers. More particularly, this disclosure relates to multicore optical fibers. Most particularly, this disclosure relates to multicore optical fibers having high core density.

BACKGROUND OF THE DISCLOSURE

Optical fibers are utilized in a variety of telecommunication applications. The most widely used optical fibers include a single core region for transmission of optical signals. The core region typically has a diameter on the order of 10 µm and is surrounded by a cladding having a diameter of 125 µm. Since the transmission capacity of single-core optical fibers is currently approaching its theoretical limits, the demand for increased transmission capacity is currently being met through increases in the number of single-core optical fibers included in transmission cables. While a higher fiber count provides higher transmission capacity, it leads to larger cables and makes it difficult to retrofit existing fiber installations, which are constrained by space limitations, with higher capacity cables. As a result, there is a need to develop solutions that provide higher transmission capacity without increasing the size of transmission cables.

One solution under consideration is multicore optical fibers. Multicore optical fibers include multiple cores embedded in a single common cladding matrix. Each core of a multicore optical fiber acts as an independent transmission channel. Since transmission capacity increases as the number of cores increases, it is desirable to maximize the density of cores in a given cross-sectional area of cladding. Core density can be increased by reducing the spacing between cores. As core spacing is reduced, however, crosstalk between cores occurs and signal quality degrades as signals transmitted in different cores mix. Core density is also limited by the spacing between cores and the outer surface of the cladding. The cladding is typically surrounded by one or more protective coatings and signal intensity in cores proximate to the outer surface of the cladding is decreased by tunneling through the cladding into a protective coating. There is a need for multicore fibers having high core density and minimal signal degradation.

SUMMARY

The present disclosure provides multicore optical fibers having high core density. The multicore optical fiber includes a multicore glass fiber that includes two or more cores surrounded by a common cladding region and an exterior cladding region that surrounds the common cladding region. The exterior cladding region has a lower index than the common cladding region and suppresses tunneling of optical signals from cores proximate to the outer surface of the multicore glass fiber.

The present description extends to:

A multicore optical fiber comprising:
 a multicore glass fiber, the multicore glass fiber comprising:
  a plurality of core regions, each of the plurality of core regions surrounded by and directly adjacent to a dedicated inner cladding region;
  a common interior cladding region surrounding the dedicated inner cladding region of each of the plurality of core regions, the common interior cladding region having a relative refractive index $\Delta_4$ and a radius $R_4$; and
  a common exterior cladding region surrounding the common interior cladding region, the common exterior cladding region having a radius $R_5 > R_4$ and a relative refractive index $\Delta_5 < \Delta_4$.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present disclosure, and together with the description serve to explain principles and operation of methods, products, and compositions embraced by the present disclosure.

BRIEF DESCRIPTION OF THE DRAWINGS

FIG. 12 depicts tunneling loss at a wavelength of 1550 nm for a core region in a multicore optical fiber with and without a common exterior cladding.

FIGS. 13-17 show illustrative designs of multicore optical fibers.

DETAILED DESCRIPTION

Figure 1:
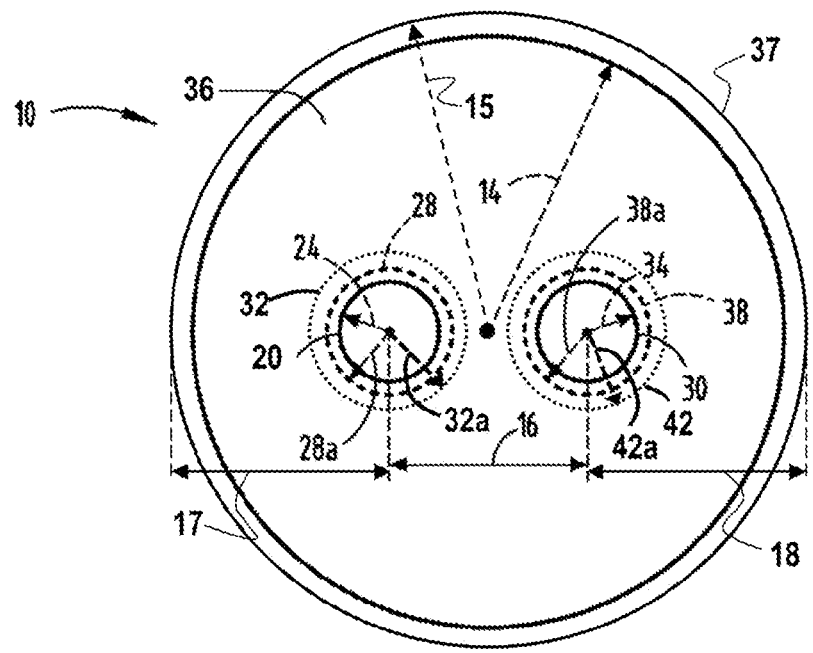
FIG. 1 depicts a cross-section of a multicore glass fiber having two core regions, each of which includes a dedicated inner cladding region, a dedicated depressed index cladding region, a common interior cladding region, and a common exterior cladding region.

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purposes of describing particular aspects only and is not intended to be limiting.

In this specification and in the claims that follow, reference will be made to a number of terms which shall be defined to have the following meanings:

"Include," "includes," "including", or like terms means encompassing but not limited to, that is, inclusive and not exclusive.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When a value is said to be about or about equal to a certain number, the value is within ±10% of the number. For example, a value that is about 10 refers to a value between 9 and 11, inclusive. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The term "about" further references all terms in the range unless otherwise stated. For example, about 1, 2, or 3 is equivalent to about 1, about 2, or about 3, and further comprises from about 1-3, from about 1-2, and from about 2-3. Specific and preferred values disclosed for compositions, components, ingredients, additives, and like aspects, and ranges thereof, are for illustration only; they do not exclude other defined values or other values within defined ranges. The compositions and methods of the disclosure include those having any value or any combination of the values, specific values, more specific values, and preferred values described herein.

The indefinite article "a" or "an" and its corresponding definite article "the" as used herein means at least one, or one or more, unless specified otherwise. The term "plurality" means two or more.

Directional terms as used herein—for example up, down, right, left, front, back, top, bottom—are made only with reference to the figures as drawn and the coordinate axis provided therewith and are not intended to imply absolute orientation.

As used herein, contact refers to direct contact or indirect contact. Direct contact refers to contact in the absence of an intervening material and indirect contact refers to contact through one or more intervening materials. Elements in direct contact touch each other. Elements in indirect contact do not touch each other, but do touch an intervening material or series of intervening materials, where the intervening material or at least one of the series of intervening materials touches the other element. Elements in contact may be rigidly or non-rigidly joined. Contacting refers to placing two elements in direct or indirect contact. Elements in direct (indirect) contact may be said to directly (indirectly) contact each other.

As used herein, "directly adjacent" means directly contacting and "indirectly adjacent" mean indirectly contacting. The term "adjacent" encompasses elements that are directly or indirectly adjacent to each other.

"Optical fiber" refers to a waveguide having a glass portion surrounded by a coating. The glass portion includes a core and a cladding, and is referred to herein as a "glass fiber". A multicore optical fiber is an optical fiber with a glass fiber that includes two or more cores surrounded by a cladding common to the two or more cores. Each core of the glass fiber of a multicore optical fiber functions as a waveguide.

"Radial position", "radius", or the radial coordinate "r" refers to radial position relative to the centerline (r=0) of a core of the multicore optical fiber. Each of the two or more cores of a multicore optical fiber has a centerline and a separate radial coordinate r. "Radial position", "radius", or the radial coordinate "R" refers to radial position relative to the centerline (R=0) of the multicore optical fiber. The multicore optical fiber has a single centerline. The radial coordinate r will be used to refer to radial position in the core region and any of the dedicated cladding regions described herein. The radial coordinate R will be used to refer to radial position in the common cladding region and the exterior cladding region described herein.

"Refractive index" refers to the refractive index at a wavelength of 1550 nm.

The "refractive index profile" is the relationship between refractive index or relative refractive index and radius. For relative refractive index profiles depicted herein as having step boundaries between adjacent core and/or cladding regions, normal variations in processing conditions may preclude obtaining sharp step boundaries at the interface of adjacent regions. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position r or R within a core region and/or any of the cladding regions. When relative refractive index varies with radial position r or R in a particular region of the fiber (e.g. core region and/or any of the dedicated, common, or exterior cladding regions described below), it is expressed in terms of its actual or approximate functional dependence, or in terms of its value at a particular radial position r or R within the region, or in terms of an average value applicable to the region as a whole. Unless otherwise specified, if the relative refractive index of a region (e.g. core region and/or any of the cladding regions) is expressed as a single value or as a parameter (e.g. Δ or Δ%) applicable to the region as a whole, it is understood that the relative refractive index in the region is constant, or approximately constant, and corresponds to the single value, or that the single value or parameter represents an average value of a non-constant relative refractive index dependence with radial position r or R in the region. For example, if i is a region of the glass fiber, the parameter $\Delta_i$ refers to the average value of relative refractive index in the region, unless otherwise specified. Whether by design or a consequence of normal manufacturing variability, the dependence of relative refractive index on radial position may be sloped, curved, or otherwise non-constant.

"Relative refractive index," as used herein, is defined in Eq. (1) as:

$$\Delta(r)\% = 100 \frac{(n^2(r) - n_{ref}^2)}{2n^2(r)} \quad (1)$$

where n(r) is the refractive index at radial position r in the glass fiber, unless otherwise specified, and $n_{ref}$ is the refractive index of pure silica glass, unless otherwise specified. For purposes of the present disclosure, $n_{ref}$=1.444, which is the refractive index of pure silica at 1550 nm. Accordingly, as used herein, the relative refractive index percent is relative to pure silica glass. As used herein, the relative refractive index is represented by Δ (or "delta") or Δ % (or "delta %) and its values are given in units of "%", unless otherwise specified. Relative refractive index may also be expressed as Δ(r) or Δ(r) %. An analogous definition of relative refractive index can be expressed in terms of radial coordinate R.

The average relative refractive index ($\Delta_{ave}$) of a region of the fiber is determined from Eq. (2):

$$\Delta_{ave} = \int_{r_{inner}}^{r_{outer}} \frac{\Delta(r)dr}{(r_{outer} - r_{inner})} \quad (2)$$

where $r_{inner}$ is the inner radius of the region, $r_{outer}$ is the outer radius of the region, and Δ(r) is the relative refractive index of the region. An analogous definition of average refractive index can be expressed in terms of radial coordinate R.

The term "α-profile" or "alpha profile" refers to a relative refractive index profile Δ(r) that has the functional form defined in Eq. (3):

$$\Delta(r) = \Delta(r_0)\left[1 - \left[\frac{|r - r_0|}{(r_z - r_0)}\right]^\alpha\right] \quad (3)$$

where $r_o$ is the radial position at which Δ(r) is maximum, $r_z > r_0$ is the radial position at which Δ(r) decreases to its minimum value, and r is in the range $r_i \leq r \leq r_f$, where $r_i$ is the initial radial position of the α-profile, $r_f$ is the final radial position of the α-profile, and α is a real number. An α-profile with an α value of 10 or more is an example of a step-index profile. An α-profile with an α value less than 10 is an example of a graded-index profile. Δ($r_0$) for an α-profile may be referred to herein as $\Delta_{max}$ or, when referring to a specific region i of the fiber, as $\Delta_{i,max}$. When the relative refractive index profile of the fiber core region is described by an α-profile with $r_0$ occurring at the centerline (r=0) and $r_z$ corresponding to the outer radius $r_1$ of the core region, Eq. (3) simplifies to Eq. (4):

$$\Delta_1(r) = \Delta_{1max}\left[1 - \left[\frac{r}{r_1}\right]^\alpha\right] \quad (4)$$

The "mode field diameter" or "MFD" of an optical fiber is defined in Eq. (5) as:

$$MFD = 2w \quad (5)$$

$$w^2 = 2\frac{\int_0^\infty (f(r))^2 r dr}{\int_0^\infty \left(\frac{df(r)}{dr}\right)^2 r dr}$$

where f(r) is the transverse component of the electric field distribution of the guided optical signal and r is radial position in the fiber. "Mode field diameter" or "MFD" depends on the wavelength of the optical signal and is reported herein for a wavelength of 1550 nm. Specific indication of the wavelength will be made when referring to mode field diameter herein. Unless otherwise specified, mode field diameter refers to the $LP_{01}$ mode at the specified wavelength.

"Effective area" of an optical fiber is defined as:

$$A_{eff} = \frac{2\pi \left[\int_0^\infty (f(r))^2 r dr\right]^2}{\int_0^\infty (f(r))^4 r dr} \quad (6)$$

where f(r) is the transverse component of the electric field of the guided optical signal and r is radial position in the fiber. "Effective area" or "$A_{eff}$" depends on the wavelength of the optical signal and is understood herein to refer to a wavelength of 1550 nm.

Reference to a difference between a first quantity and a second quantity means the result obtained by subtracting the second quantity from the first quantity. For example, a difference between a radius $r_i$ and a radius $r_j$ refers to $r_i - r_j$. Reference to a magnitude of a quantity or a magnitude of a difference refers to the absolute value of the quantity or the difference.

The cutoff wavelength of an optical fiber is the minimum wavelength at which the optical fiber will support only one propagating mode. For wavelengths below the cutoff wavelength, multimode transmission may occur and an additional source of dispersion may arise to limit the fiber's information carrying capacity. Cutoff wavelength will be reported herein as a fiber cutoff wavelength or a cable cutoff wavelength. The fiber cutoff wavelength is based on a 2-meter fiber length and the cable cutoff wavelength is based on a 22-meter cabled fiber length. The 22-meter cable cutoff wavelength is typically less than the 2-meter cutoff wavelength due to higher levels of bending and mechanical pressure in the cable environment. The fiber cutoff wavelength $\lambda_{CF}$ is based on a 2-meter fiber length while the cable cutoff wavelength $\lambda_{CC}$ is based on a 22-meter cabled fiber length as specified in TIA-455-80: FOTP-80 IEC-60793-1-44 Optical Fibres—Part 1-44: Measurement Methods and Test Procedures—Cut-off Wavelength (21 May 2003), by Telecommunications Industry Association (TIA). Each core of a multicore optical fibers exhibits a cutoff wavelength. The cutoff wavelength may be the same or different for different cores.

"Chromatic dispersion", herein referred to as "dispersion" unless otherwise noted, of an optical fiber is the sum of the material dispersion and the waveguide dispersion. The zero-dispersion wavelength ($\lambda_0$) is the wavelength at which the dispersion has a value of zero. Dispersion slope is the rate of change of dispersion with respect to wavelength. Dispersion and dispersion slope are reported herein at a wavelength of 1550 nm and are expressed in units of ps/nm·km and ps/nm²·km, respectively. Each core of a multicore optical fibers exhibits dispersion. The dispersion may be the same or different for different cores.

The multicore optical fibers disclosed herein include two or more core regions, a cladding region that includes an interior cladding region common to at least two of the two or more core regions, and an exterior cladding region surrounding and directly adjacent to the interior cladding region. The core regions and cladding regions are glass. The cladding region includes multiple regions that differ in relative refractive index. Types of cladding regions include dedicated cladding regions and common cladding regions. A cladding region is said to be "dedicated" if it surrounds only one core of the two or more cores and is said to be "common" if it surrounds at least two cores of the two or more cores. In embodiments described herein, at least two of the cladding regions are common to two or more cores of the multicore fiber. Preferably, the at least two common cladding regions are common to all cores of the multicore optical fiber. Each core of the multicore optical fiber includes at least one dedicated cladding region and at least two common cladding regions. In a preferred embodiment, each core region includes at least one dedicated cladding region directly adjacent to the core region and in embodiments with two or more dedicated cladding regions, at least one of the two or more dedicated cladding regions is directly adjacent to the core region and each of the others of the two or more dedicated cladding regions is directly adjacent to another of the two or more dedicated cladding region. In another preferred embodiment, one of the at least two common cladding regions is directly adjacent to the dedicated cladding region furthest removed from the core region. A common cladding region directly adjacent to the core region or the furthest removed of a series of one or more dedicated cladding regions is referred to herein as an interior common cladding region. The outermost (most radially distant) common cladding region is referred to herein as an exterior common cladding region. An exterior common cladding region defines the outer surface of the glass fiber. In some embodiments, the exterior common cladding region surrounds and is directly adjacent to the interior common cladding region. In other embodiments, one or more intermediate common cladding regions is disposed between the interior common cladding region and the exterior common cladding region. The multicore optical fibers preferably further include a coating surrounding the exterior cladding region.

In some embodiments, the cladding region of a core region includes a dedicated inner cladding region surrounding and directly adjacent to the core region, an interior common cladding region surrounding and directly adjacent to the dedicated inner cladding region, and an exterior common cladding region surrounding and directly adjacent to the interior common cladding region. The relative refractive index of the dedicated inner cladding region is less than the relative refractive index of the core region. The relative refractive index of the exterior common cladding region is less than the relative refractive index of the interior common cladding region. In some embodiments, the relative refractive index of the interior common cladding region is greater than the relative refractive index of the exterior common cladding region and the relative refractive index of the dedicated inner cladding region.

In some embodiments, the cladding region of a core region includes a dedicated inner cladding region surrounding and directly adjacent to the core region, a dedicated depressed index cladding region surrounding and directly adjacent to the dedicated inner cladding region, an interior common cladding region surrounding and directly adjacent to the dedicated depressed index cladding region, and an exterior common cladding region surrounding and directly adjacent to the interior common cladding region. The relative refractive index of the dedicated inner cladding region is less than the relative refractive index of the core region and the relative refractive index of the dedicated depressed index cladding region is less than the relative refractive index of the dedicated inner cladding region. The relative refractive index of the exterior common cladding region is less than the relative refractive index of the interior common cladding region. In some embodiments, the relative refractive index of the exterior common cladding region is less than the relative refractive index of the interior common cladding region and the relative refractive index of the dedicated inner cladding region. In some embodiments, the relative refractive index of the interior common cladding region is greater than the relative refractive index of the exterior common cladding region and the relative refractive index of the dedicated depressed index cladding region.

In some embodiments, the cladding region of a core region includes a dedicated outer cladding region disposed between a dedicated inner cladding region and an interior common cladding region or between a dedicated depressed index cladding region and an interior common cladding region. Preferably, when present, a dedicated outer cladding region is surrounded by and directly adjacent to the interior common cladding region and the dedicated outer cladding region surrounds and is directly adjacent to a dedicated inner cladding region or a dedicated depressed index cladding region.

The core region, inner cladding region, depressed index cladding region, outer cladding region interior common cladding region and exterior common cladding region are also referred to herein as core, cladding, inner cladding, depressed index cladding, outer cladding, interior cladding and exterior cladding, respectively.

Whenever used herein, radial position $r_1$ and relative refractive index $\Delta_1$ or $\Delta_1(r)$ refer to a core region, radial position $r_2$ and relative refractive index $\Delta_2$ or $\Delta_2(r)$ refer to a dedicated inner cladding region, radial position $r_3$ and relative refractive index $\Delta_3$ or $\Delta_3(r)$ refer to a dedicated depressed index cladding region, radial position $r_4$ and relative refractive index $\Delta_{4doc}$ or $\Delta_{4doc}(r)$ refer to a dedicated outer cladding region, radial position $R_4$ and relative refractive index $\Delta_4$ or $\Delta_4(R)$ refer to an interior common cladding region, radial position $R_5$ and relative refractive index $\Delta_5$ or $\Delta_5(R)$ refer to an exterior common cladding region, radial position $R_6$ refers to a primary coating, and radial position $R_7$ refers to a secondary coating. Each radial position $r_i$ (i=1, 2, 3, or 4) and $R_i$ (i=4, 5, 6, or 7) refers to the outer radius of the region associated with the value i. For example, $r_1$ refers to the outer radius of a core region, $r_2$ refers to the outer radius of a dedicated inner cladding region etc.

When helpful for purposes of clarity to identify radial positions and relative refractive indices of different core regions, different dedicated inner cladding regions, different dedicated depressed index cladding regions, and/or different dedicated outer cladding regions of the multicore glass fiber, a second identifying subscript will be used. For example, the radius $r_{ij}$ refers to the radial position $r_i$ of the $j^{th}$ region of type i in the multicore glass fiber and $\Delta_{i,j}$ refers to the relative refractive index $\Delta_i$ of the $j^{th}$ region of type i in the multicore glass fiber. Regions of type i include a core region (i=1), a dedicated inner cladding region (i=2), a dedicated depressed index cladding region (i=3) and a dedicated outer cladding region (i=4). For purposes of illustration, the radial positions $r_{1,1}$ and $r_{1,2}$ refer to the outer radius $r_1$ (i=1) of a first core region (j=1) and the outer radius $r_1$ (i=1) of a second core region (j=2) of a multicore glass fiber, respectively. Similarly, the relative refractive indices $\Delta_{1,1}$ and $\Delta_{1,2}$ refer to the relative refractive index $\Delta_1$ (i=1) of a first core region (j=1) and the relative refractive index $\Delta_1$ (i=1) of a second core region (j=2) of a multicore glass fiber, respectively. When a symbol designating a radial position or relative refractive index includes a single subscript, it is understood that the symbol and subscript refer to any of the regions of type i in the multicore glass fiber, where it is further understood that the numerical value associated with the symbol and subscript may be the same or different for the different regions of type i in the multicore glass fiber. For example, the radial position $r_1$ refers to the outer radius of any of the core regions of the multicore glass fiber, where it is understood that the numerical value of the outer radius $r_1$ may be the same or different for any two of the different core regions in the multicore glass fiber.

The relative refractive index $\Delta_1(r)$ has a maximum value $\Delta_{1max}$ and a minimum value $\Delta_{1min}$. The relative refractive index $\Delta_2(r)$ has a maximum value $\Delta_{2max}$ and a minimum value $\Delta_{2min}$. The relative refractive index $\Delta_3(r)$ has a maximum value $\Delta_{3max}$ and a minimum value $\Delta_{3min}$. The relative refractive index $\Delta_{4doc}(r)$ has a maximum value $\Delta_{4docmax}$ and a minimum value $\Delta_{4docmin}$. The relative refractive index $\Delta_4(R)$ has a maximum value $\Delta_{4max}$ and a minimum value $\Delta_{4min}$. The relative refractive index $\Delta_5(R)$ has a maximum value $\Delta_{5max}$ and a minimum value $\Delta_{5min}$. In embodiments in which the relative refractive index is constant or approximately constant over a region (e.g. a step-index profile), the maximum and minimum values of the relative refractive index are equal or approximately equal. Unless otherwise specified, if a single value is reported for the relative refractive index of a region (dedicated or common), the single value corresponds to an average value for the region. For core regions with an α-profile or graded-index relative refractive index profile, $\Delta_{1max}$ corresponds to the value of $\Delta_1$ at the centerline (r=0) of the core region in some embodiments. In some embodiments, $\Delta_{1max}$ is offset from the centerline (r=0) of the core (e.g. a centerline dip in relative refractive index may be present).

It is understood that a core region is substantially cylindrical in shape and that a dedicated inner cladding region, a dedicated depressed index cladding region, a dedicated outer cladding region, a common exterior cladding region, a primary coating, and a secondary coating are substantially annular in shape. Common interior cladding regions have shapes with internal cavities sized to accommodate the two or more cores and any dedicated cladding regions accompanying the two or more cores. The outer surface of a common interior cladding region preferably has a circular circumference that defines the radius $R_4$. Annular regions are characterized in terms of an inner radius and an outer radius.

Radial positions $r_1$, $r_2$, $r_3$, and $r_{4doc}$, refer herein to the outermost radii of a core region, a dedicated inner cladding region, a dedicated depressed index cladding region, and a dedicated outer cladding, respectively. The glass fiber of the multicore optical fiber is preferably substantially cylindrical in shape and $R_5$ refers to the outer radius of the glass fiber, which corresponds to the outer radius of the common exterior cladding. In some embodiments, the glass fiber is surrounded by a primary coating and a secondary coating, each of which is substantially annular in shape. The radius $R_6$ refers to the outer radius of the primary coating and the radius $R_7$ refers to the outer radius of the secondary coating.

When two dedicated cladding regions are directly adjacent to each other, the outer radius of the inner of the two dedicated cladding regions coincides with the inner radius of the outer of the two dedicated cladding regions. In one embodiment, for example, the glass fiber includes a core with a dedicated inner cladding region surrounded by and directly adjacent to a dedicated depressed index cladding region. In such an embodiment, the radius $r_2$ corresponds to the outer radius of the dedicated inner cladding region and the inner radius of the dedicated depressed index cladding region. In embodiments in which the relative refractive index profile includes a dedicated inner cladding region directly adjacent to the core, the radial position $r_1$ corresponds to the outer radius of the core and the inner radius of the dedicated inner cladding region.

The following terminology applies to embodiments in which the relative refractive index profile includes a dedicated inner cladding region surrounding and directly adjacent to a core region, a common interior cladding region surrounding and directly adjacent to the dedicated inner cladding region, and a common exterior cladding region surrounding and directly adjacent to the common interior cladding region. The difference $r_2-r_1$ between radial position $r_2$ and radial position $r_1$ is referred to herein as the thickness of the dedicated inner cladding region. The difference $R_5-R_4$ between radial position $R_5$ and radial position $R_4$ is referred to herein as the thickness of the common exterior cladding region.

The following terminology applies to embodiments in which the relative refractive index profile includes a dedicated inner cladding region surrounding and directly adjacent to a core region, a dedicated depressed index cladding region surrounding and directly adjacent to the dedicated inner cladding region, a common interior cladding region surrounding and directly adjacent to the dedicated depressed index cladding region, and a common exterior cladding region surrounding and directly adjacent to the common interior cladding region. The difference $r_2-r_1$ between radial position $r_2$ and radial position $r_1$ is referred to herein as the thickness of the dedicated inner cladding region. The difference $r_3-r_2$ between radial position $r_3$ and radial position $r_2$ is referred to herein as the thickness of the dedicated depressed index cladding region. The difference $R_5-R_4$ between radial position $R_5$ and radial position $R_4$ is referred to herein as the thickness of the common exterior cladding region.

In embodiments with a primary coating surrounding and directly adjacent to a common exterior cladding region, and a secondary coating surrounding and directly adjacent the primary coating, the difference $R_6-R_5$ between radial position $R_6$ and radial position $R_5$ is referred to herein as the thickness of the primary coating and the difference $R_7-R_6$ between radial position $R_7$ and radial position $R_6$ is referred to herein as the thickness of the secondary coating.

As will be described further hereinbelow, the relative refractive indices of the core region, dedicated inner cladding region, dedicated depressed index cladding region, dedicated outer cladding region, common interior cladding region and common exterior cladding region may differ. The relative refractive index of the core region is higher than the relative refractive index of any of the dedicated or common cladding regions. The relative refractive index of an inner cladding region may be greater than, less than or equal to the relative refractive index of a common interior cladding region. In embodiments that include a dedicated inner cladding region, a dedicated depressed index cladding region, a common interior cladding region and a common exterior cladding region, the relative refractive index of the dedicated depressed index cladding region is less than the relative refractive index of the dedicated inner cladding region and the relative refractive index of the common interior cladding region. Any or all of the relative refractive indices, radial positions, and thicknesses of the core region, dedicated inner cladding region, dedicated depressed index cladding region, and dedicated outer cladding region for different cores of the multicore optical fiber may be the same or different. In different embodiments, all cores of the multicore optical fiber have step-index profiles, all cores of the multicore optical fiber have graded-index profiles, or some cores of the multicore optical fiber have step-index profiles and other cores of the multicore optical fiber have graded-index profiles.

Each of the regions may be formed from doped or undoped silica glass. Variations in refractive index relative to undoped silica glass are accomplished by incorporating updopants or downdopants at levels designed to provide a targeted refractive index or refractive index profile using techniques known to those of skill in the art. Updopants are dopants that increase the refractive index of the glass relative to the undoped glass composition. Downdopants are dopants that decrease the refractive index of the glass relative to the undoped glass composition. In one embodiment, the undoped glass is silica glass. When the undoped glass is silica glass, updopants include Cl, Br, Ge, Al, P, Ti, Zr, Nb, and Ta, and downdopants include F and B. Regions of constant refractive index may be formed by not doping or by doping at a uniform concentration over the thickness of the region. Regions of variable refractive index are formed through non-uniform spatial distributions of dopants over the thickness of a region and/or through incorporation of different dopants in different regions.

The term "mode" refers to guided mode. A single-mode fiber is an optical fiber designed to support only the fundamental LP01 modes over a substantial length of the optical fiber (e.g., at least several meters), but that under certain circumstances can support multiple modes over short distances (e.g., tens of centimeters). We assume that the birefringence of the fiber is sufficiently low to assume that the two orthogonally polarized components of the LP01 mode are degenerate and propagate with the same phase velocity. A multimode optical fiber is an optical fiber designed to support the fundamental LP01 mode and at least one higher-order $LP_{nm}$ mode over a substantial length of the optical fiber, where either n≠0 or m≠1.

The present disclosure provides multicore glass fibers and multicore optical fibers as well as ribbons and cables containing multicore glass fibers and multicore optical fibers. In a ribbon, the multicore glass fibers or multicore optical fibers are aligned relative to one another in a substantially planar and parallel relationship. The multicore glass fibers or multicore optical fibers in ribbons are encapsulated by a ribbon matrix in any of several known configurations (e.g., edge-bonded ribbon, thin-encapsulated ribbon, thick-encapsulated ribbon, or multi-layer ribbon) by conventional methods of making fiber optic ribbons. The ribbon contains two or more multicore glass fibers or multicore optical fibers. In some embodiments, the ribbon contains four or more, or eight or more, or twelve or more, or sixteen or more multicore glass fibers or multicore optical fibers. The ribbon matrix has tensile properties similar to the tensile properties of a secondary coating and is formed from the same, similar, or different composition used to prepare a secondary coating. A cable includes a plurality of multicore glass fibers or multicore optical fibers surrounded by a jacket. The jacket typically has a circular cross-section and is flexible or rigid depending on the application requirement. Multicore glass fibers or multicore optical fibers are densely or loosely packed into a conduit enclosed by an inner surface of the jacket. The number of fibers placed in the jacket is referred to as the "fiber count" of cable. The jacket is formed from an extruded polymer material and may include multiple concentric layers of polymers or other materials. The cable may also include one or more strengthening members embedded within the jacket or placed within the conduit defined by the inner surface of the jacket. Strengthening members include fibers or rods that are more rigid than the jacket. The strengthening member is made from metal, braided steel, glass-reinforced plastic, fiber glass, or other suitable material. The cable may include other layers surrounded by the jacket (e.g. armor layers, moisture barrier layers, rip cords, etc.). The cable may have a stranded, loose tube core or other fiber optic cable construction.

For purposes of illustration, the disclosure that follows describes multicore glass fibers having two cores. It should be apparent, however, that multicore glass fibers having more than two cores are similarly contemplated and within the scope of the disclosure. The number of cores in the multicore fiber is two or more, or three or more, or four or more, or six or more, or eight or more, or twelve or more, or sixteen or more, or between 2 and 32, or between 3 and 28, or between 4 and 24, or between 6 and 20, or between 8 and 16. Particular characteristics of the arrangement of cores that minimize crosstalk between cores or tunneling outside of the glass fiber are also described. These characteristics apply similarly to any pair or combination of cores in multicore glass fibers having more than two cores. Although the disclosure emphasizes multicore glass fibers, it is further understood that one or more polymer coatings may be applied to the outer surface of the multicore glass fiber. Polymer coatings include primary coatings, secondary coatings, ink layers, and matrix materials known in the art.

One example of a relative refractive index profile is a step-index relative refractive index profile, which has a core region whose refractive index is constant or approximately constant with distance from the centerline of the core. One example of a step-index fiber is a fiber with a core region having a relative refractive index profile with an α-profile with a value of α greater than or equal to 10. Another example of a relative refractive index profile is a graded-index profile, which has a core region whose refractive index varies with distance from the centerline of the core. One example of a graded-index fiber is a fiber with a core region having a relative refractive index profile with an α-profile with a value of α less than 10.

FIG. 1 illustrates a multicore glass fiber with two cores. In each core, a core region is surrounded by and directly adjacent to a dedicated inner cladding region, which is surrounded by and directly adjacent to a dedicated depressed index cladding region, which is surrounded by and directly adjacent to a common interior cladding region, which is surrounded by and directly adjacent to a common exterior cladding region. A first core includes core region 20, dedicated inner cladding region 28, dedicated depressed index cladding region 32, common interior cladding region 36, and common exterior cladding region 37. Core region 20 has an outer radius $r_1$ depicted at 24. Dedicated inner cladding region 28 has an inner radius depicted at 24 and an outer radius $r_2$ depicted at 28a. Dedicated depressed index cladding region 32 has an inner radius depicted at 28a and an outer radius n depicted at 32a. A second core includes core region 30, dedicated inner cladding region 38, dedicated depressed index cladding region 42, common interior cladding region 36, and common exterior cladding region 37. Core region 30 has an outer radius $r_1$ depicted at 34. Dedicated inner cladding region 38 has an inner radius depicted at 34 and an outer radius $r_2$ depicted at 38a. Dedicated depressed index cladding region 42 has an inner radius depicted at 38a and an outer radius $r_3$ depicted at 42a. Common interior cladding region 36 has a radius $R_4$ depicted at 14 and common exterior cladding region 37 has a radius $R_5$ depicted at 15. The core spacing between the centerlines of core regions 20 and 30 is depicted at 16. As used herein, "core spacing" of a core refers to the shortest distance between the centerline of the core and the centerline of another core. Cores positioned at the core spacing are said to be "adjacent" to each other and are referred to herein as "adjacent cores" or a pair of adjacent cores. The core spacings of the cores in a multicore optical fiber are preferably the same, but may be different. The edge spacing between the centerline of core region 20 and the outer surface of common exterior cladding region 37 is depicted at 17. The edge spacing between the centerline of core region 30 and the outer surface of common exterior cladding region 37 is depicted at 18. As used herein, "edge spacing" of a core refers to the shortest distance between the centerline of the core and the outer surface of the common exterior cladding region (the surface defined by the radius $R_5$). Edge spacings 17 and 18 may be the same or different. In embodiments with three or more cores, the edge spacing of any pair of cores may be the same or different.

Figure 2:
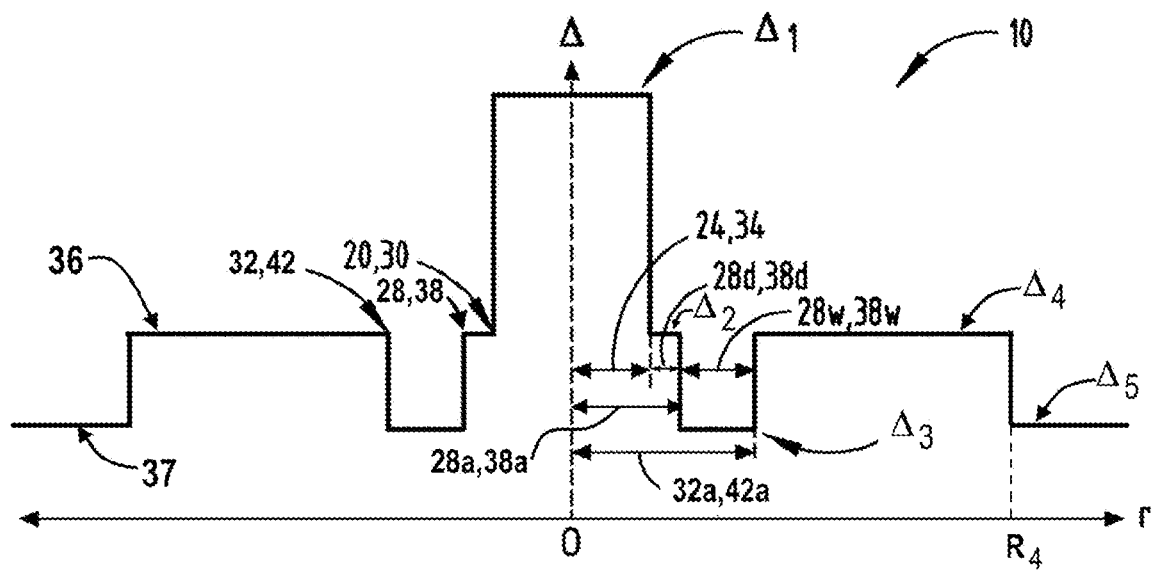
FIG. 2 depicts an exemplary step-index profile for a core in the multicore glass fiber shown in FIG. 1.

FIG. 2 depicts a relative refractive index profile for cores of a multicore glass fiber having a dedicated inner cladding region, a dedicated depressed index cladding region, a common interior cladding region and a common exterior cladding region as shown, for example, in FIG. 1. Relative refractive index profile 10 depicts core regions 20, 30 with radius $r_1$ depicted at 24, 34; dedicated inner cladding regions 28, 38 with radius $r_2$ depicted at 28a, 38a and thickness $r_2-r_1$ depicted at 28d, 38d; dedicated depressed index cladding regions 32, 42 with radius $r_3$ depicted at 32a, 42a and thickness $r_3-r_2$ depicted at 28w, 38w; common interior cladding region 36 with radius $R_4$ as depicted; and common exterior cladding region 37 with radius $R_5$ (not shown). $\Delta_1$, $\Delta_2$, $\Delta_3$, $\Delta_4$, and $\Delta_5$ for the regions are also shown. Core regions 20, 30 each have a step-index relative refractive index profile. Although the radii $r_1$, $r_2$ and $r_3$ and relative refractive indices $\Delta_1$, $\Delta_2$, and $\Delta_3$ are depicted as being the same for core regions 20, 30 in FIG. 2, it is understood that in other embodiments any or all of $r_1$, $r_2$, $r_3$, $\Delta_1$, $\Delta_2$, and $\Delta_3$ may differ for core regions 20, 30. The radii $R_4$ and $R_5$, and the relative refractive indices $\Delta_4$ and $\Delta_5$ are the same for all core regions of the multicore optical fiber. In the embodiment of FIG. 2, the relative refractive indices $\Delta_3$ and $\Delta_5$ are depicted as being the same. It is understood that in other embodiments, $\Delta_3 > \Delta_5$ or $\Delta_3 < \Delta_5$. In the embodiment of FIG. 2, the relative refractive indices $\Delta_2$ and $\Delta_4$ are depicted as being the same. It is understood that in other embodiments, $\Delta_2 > \Delta_4$ or $\Delta_2 < \Delta_4$.

Figure 3:
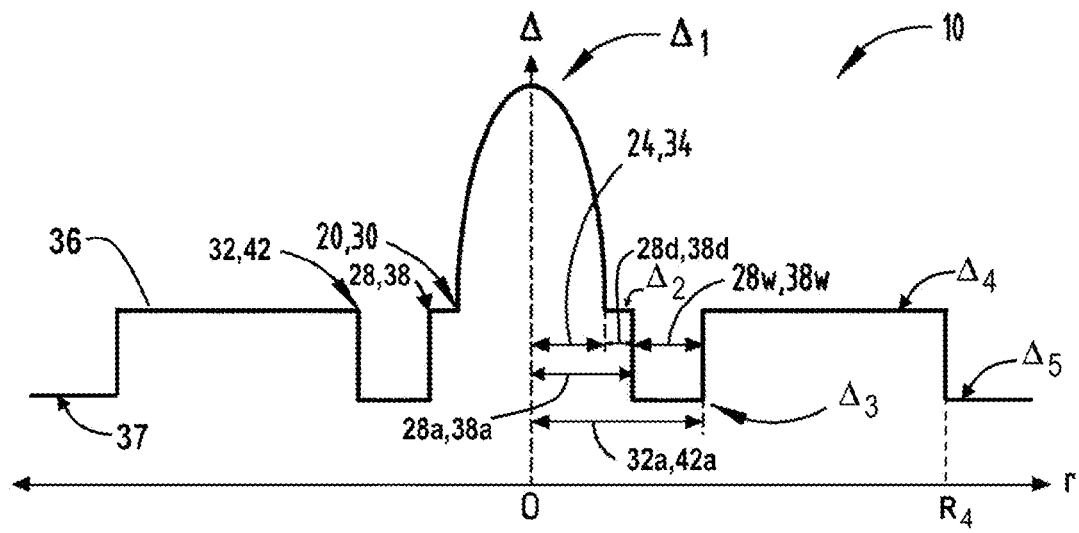
FIG. 3 depicts an exemplary α-profile for a core in the multicore glass fiber shown in FIG. 1.

FIG. 3 depicts a relative refractive index profile for cores of a multicore glass fiber having a dedicated inner cladding region, a dedicated depressed index cladding region, a common interior cladding region, and a common exterior cladding region as shown, for example, in FIG. 1. Relative refractive index profile 10 depicts core regions 20, 30 with radius $r_1$ depicted at 24, 34; dedicated inner cladding regions 28, 38 with radius $r_2$ depicted at 28a, 38a and thickness $r_2-r_1$ depicted at 28d, 38d; dedicated depressed index cladding regions 32, 42 with radius $r_3$ depicted at 32a, 42a and thickness $r_3-r_2$ depicted at 28w, 38w; common interior cladding region 36 with radius $R_4$ as depicted; and common exterior cladding region 37 with radius $R_5$ (not shown). $\Delta_1$, $\Delta_2$, $\Delta_3$, $\Delta_4$, and $\Delta_5$ for the regions are also shown. In one embodiment, core regions 20, 30 each have a graded-index relative refractive index profile. Although the radii $r_1$, $r_2$ and $r_3$ and relative refractive indices $\Delta_1$, $\Delta_2$, and $\Delta_3$ are depicted as being the same for core regions 20, 30 in FIG. 3, it is understood that in other embodiments any or all of $r_1$, $r_2$, $r_3$, $\Delta_1$, $\Delta_2$, and $\Delta_3$ may differ for core regions 20, 30. The radii $R_4$ and $R_5$, and the relative refractive indices $\Delta_4$ and $\Delta_5$ are the same for all core regions of the multicore optical fiber. In the embodiment of FIG. 3, the relative refractive indices $\Delta_3$ and $\Delta_5$ are depicted as being the same. It is understood that in other embodiments, $\Delta_3 > \Delta_5$ or $\Delta_3 < \Delta_5$. In the embodiment of FIG. 3, the relative refractive indices $\Delta_2$ and $\Delta_4$ are depicted as being the same. It is understood that in other embodiments, $\Delta_2 > \Delta_4$ or $\Delta_2 < \Delta_4$.

Figure 4:
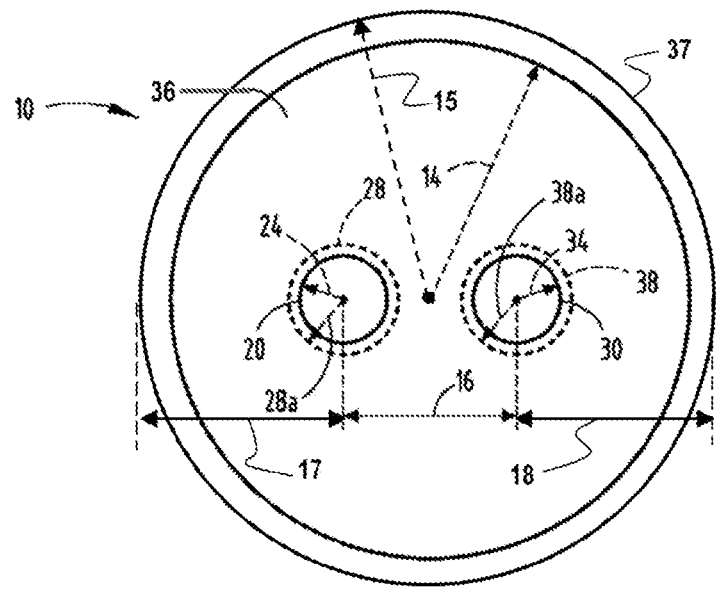
FIG. 4 depicts a cross-section of a multicore glass fiber having two core regions, each of which has a dedicated inner cladding region, a common interior cladding region, and a common exterior cladding region.

FIG. 4 illustrates a multicore glass fiber with two cores. In each core, a core region is surrounded by and directly adjacent to a dedicated inner cladding region, which is surrounded by and directly adjacent to a common interior cladding region, which is surrounded by and directly adjacent to a common exterior cladding region. A first core includes core region 20, dedicated inner cladding region 28, common interior cladding region 36, and common exterior cladding region 37. Core region 20 has an outer radius $r_1$ depicted at 24. Dedicated inner cladding region 28 has an inner radius depicted at 24 and an outer radius $r_2$ depicted at 28a. A second core includes core region 30, dedicated inner cladding region 38, common interior cladding region 36, and common exterior cladding region 37. Core region 30 has an outer radius $r_1$ depicted at 34. Dedicated inner cladding region 38 has an inner radius depicted at 34 and an outer radius $r_2$ depicted at 38a. Common interior cladding region 36 has a radius $R_4$ depicted at 14 and common exterior cladding region 37 has a radius $R_5$ depicted at 15. The core spacing between the centerlines of core regions 20 and 30 is depicted at 16. As used herein, "core spacing" of a core refers to the shortest distance between the centerline of the core and the centerline of another core. The edge spacing between the centerline of core region 20 and the outer surface of common exterior cladding region 37 is depicted at 17. The edge spacing between the centerline of core region 30 and the outer surface of common exterior cladding region 37 is depicted at 18. As used herein, "edge spacing" of a core refers to the shortest distance between the centerline of the core and the outer surface of the common exterior cladding region (the surface defined by the radius $R_5$). Edge spacings 17 and 18 may be the same or different. In embodiments with three or more cores, the edge spacing of any pair of cores may be the same or different.

Figure 5:
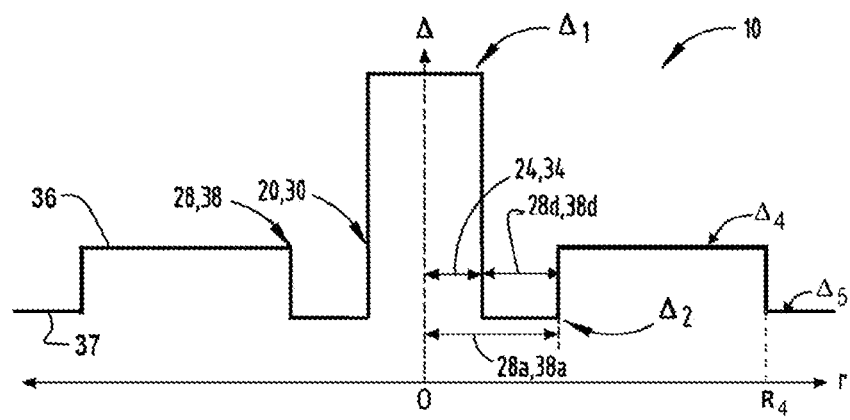
FIG. 5 depicts an exemplary step-index profile for a core in the multicore glass fiber shown in FIG. 4.

FIG. 5 depicts a relative refractive index profile for cores of a multicore glass fiber having a dedicated inner cladding region, a common interior cladding region and a common exterior cladding region as shown, for example, in FIG. 4. Relative refractive index profile 10 depicts core regions 20, 30 with radius $r_1$ depicted at 24, 34; dedicated inner cladding regions 28, 38 with radius $r_2$ depicted at 28a, 38a and thickness $r_2$–$r_1$ depicted at 28d, 38d; common interior cladding region 36 with radius $R_4$ as depicted; and common exterior cladding region 37 with radius $R_5$ (not shown). $\Delta_1$, $\Delta_2$, $\Delta_4$, and $\Delta_5$ for the regions are also shown. Core regions 20, 30 each have a step-index relative refractive index profile. Although the radii $r_1$ and $r_2$ and relative refractive indices $\Delta_1$, and $\Delta_2$ are depicted as being the same for core regions 20, 30 in FIG. 2, it is understood that in other embodiments any or all of $r_1$, $r_2$, $\Delta_1$, and $\Delta_2$ may differ for core regions 20, 30. The radii $R_4$ and $R_5$, and the relative refractive indices $\Delta_4$ and $\Delta_5$ are the same for all core regions of the multicore optical fiber. In the embodiment of FIG. 5, the relative refractive indices $\Delta_2$ and $\Delta_5$ are depicted as being the same. It is understood that in other embodiments, $\Delta_2 > \Delta_5$ or $\Delta_2 < \Delta_5$.

Figure 6:
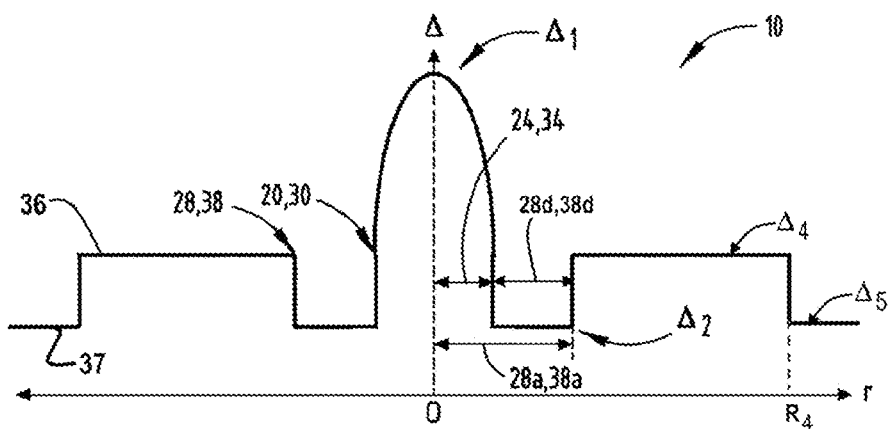
FIG. 6 depicts an exemplary α-profile for a core in the multicore glass fiber shown in FIG. 4.

FIG. 6 depicts a relative refractive index profile for cores of a multicore glass fiber having a dedicated inner cladding region, a common interior cladding region, and a common exterior cladding region as shown, for example, in FIG. 4. Relative refractive index profile 10 depicts core regions 20, 30 with radius $r_1$ depicted at 24, 34; dedicated inner cladding regions 28, 38 with radius $r_2$ depicted at 28a, 38a and thickness $r_2$–$r_1$ depicted at 28d, 38d; common interior cladding region 36 with radius $R_4$ as depicted; and common exterior cladding region 37 with radius $R_5$ (not shown). $\Delta_1$, $\Delta_2$, $\Delta_4$, and $\Delta_5$ for the regions are also shown. In one embodiment, core regions 20, 30 each have a graded-index relative refractive index profile. Although the radii $r_1$ and $r_2$ and relative refractive indices $\Delta_1$ and $\Delta_2$ are depicted as being the same for core regions 20, 30 in FIG. 6, it is understood that in other embodiments any or all of $r_1$, $r_2$, $\Delta_1$, and $\Delta_2$ may differ for core regions 20, 30. The radii $R_4$ and $R_5$, and the relative refractive indices $\Delta_4$ and $\Delta_5$ are the same for all core regions of the multicore optical fiber. In the embodiment of FIG. 6, the relative refractive indices $\Delta_2$ and $\Delta_5$ are depicted as being the same. It is understood that in other embodiments, $\Delta_2 > \Delta_5$ or $\Delta_2 < \Delta_5$.

Figure 7:
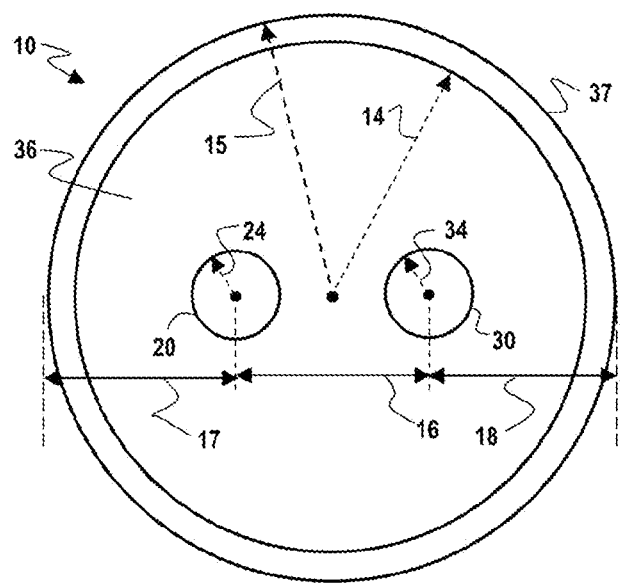
FIG. 7 depicts a cross-section of a multicore glass fiber having two core regions, a common interior cladding region, and a common exterior cladding region.

FIG. 7 illustrates a multicore glass fiber with two cores. In each core, a core region is surrounded by and directly adjacent to a common interior cladding region, which is surrounded by and directly adjacent to a common exterior cladding region. A first core includes core region 20, common interior cladding region 36, and common exterior cladding region 37. Core region 20 has an outer radius $r_1$ depicted at 24. A second core includes core region 30, common interior cladding region 36, and common exterior cladding region 37. Core region 30 has an outer radius $r_1$ depicted at 34. Common interior cladding region 36 has a radius $R_4$ depicted at 14 and common exterior cladding region 37 has a radius $R_5$ depicted at 15. The core spacing between the centerlines of core regions 20 and 30 is depicted at 16. As used herein, "core spacing" of a core refers to the shortest distance between the centerline of the core and the centerline of another core. The edge spacing between the centerline of core region 20 and the outer surface of common exterior cladding region 37 is depicted at 17. The edge spacing between the centerline of core region 30 and the outer surface of common exterior cladding region 37 is depicted at 18. As used herein, "edge spacing" of a core refers to the shortest distance between the centerline of the core and the outer surface of the common exterior cladding region (the surface defined by the radius $R_5$). Edge spacings 17 and 18 may be the same or different. In embodiments with three or more cores, the edge spacing of any pair of cores may be the same or different.

Figure 8:
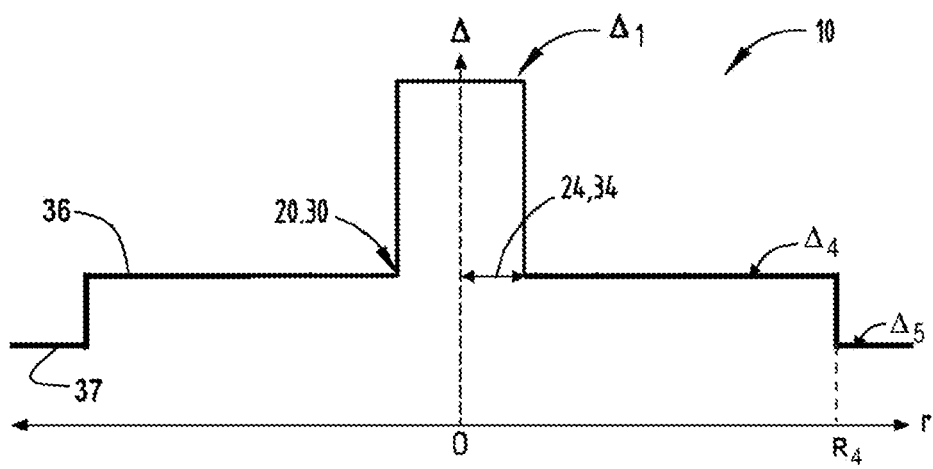
FIG. 8 depicts an exemplary step-index profile for a core in the multicore glass fiber shown in FIG. 7.

FIG. 8 depicts a relative refractive index profile for cores of a multicore glass fiber having a common interior cladding region and a common exterior cladding region as shown, for example, in FIG. 7. Relative refractive index profile 10 depicts core regions 20, 30 with radius $r_1$ depicted at 24, 34; common interior cladding region 36 with radius $R_4$ as depicted; and common exterior cladding region 37 with radius $R_5$ (not shown). $\Delta_1$, $\Delta_4$, and $\Delta_5$ for the regions are also shown. Core regions 20, 30 each have a step-index relative refractive index profile. Although the radius $r_1$ and relative refractive index $\Delta_1$ are depicted as being the same for core regions 20, 30 in FIG. 8, it is understood that in other embodiments any or all of $r_1$ and $\Delta_1$ may differ for core regions 20, 30. The radii $R_4$ and $R_5$, and the relative refractive indices $\Delta_4$ and $\Delta_5$ are the same for all core regions of the multicore optical fiber.

Figure 9:
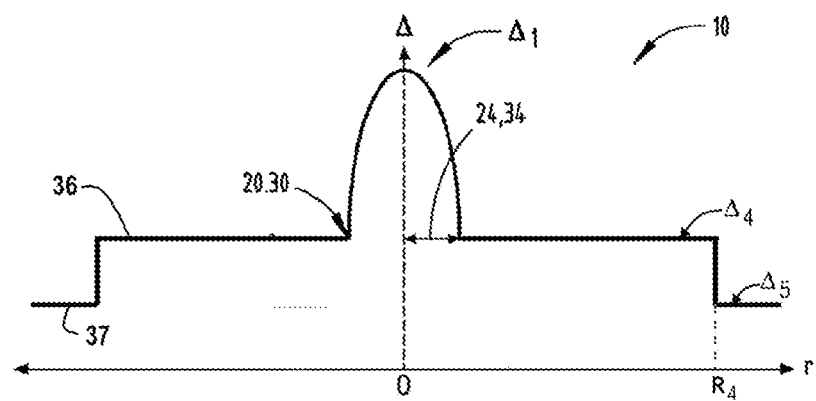
FIG. 9 depicts an exemplary step-index profile for a core in the multicore glass fiber shown in FIG. 7.

FIG. 9 depicts a relative refractive index profile for cores of a multicore glass fiber having a common interior cladding region, and a common exterior cladding region as shown, for example, in FIG. 7. Relative refractive index profile 10 depicts core regions 20, 30 with radius $r_1$ depicted at 24, 34; common interior cladding region 36 with radius $R_4$ as depicted; and common exterior cladding region 37 with radius $R_5$ (not shown). $\Delta_1$, $\Delta_4$, and $\Delta_5$ for the regions are also shown. In one embodiment, core regions 20, 30 each have a graded-index relative refractive index profile. Although the radius $r_1$ and relative refractive index $\Delta_1$ are depicted as being the same for core regions 20, 30 in FIG. 9, it is understood that in other embodiments any or all of $r_1$ and $\Delta_1$ may differ for core regions 20, 30. The radii $R_4$ and $R_5$, and the relative refractive indices $\Delta_4$ and $\Delta_5$ are the same for all core regions of the multicore optical fiber.

In some embodiments, the multicore glass fiber includes a core with a step-index relative refractive index profile and a core with a graded-index (e.g. α-profile) relative refractive index profile.

As noted above, radii ($r_1$, $r_2$, and/or $r_3$), relative refractive indices of the core regions and dedicated cladding regions ($\Delta_1$, $\Delta_2$, and/or $\Delta_3$), and core profile (step index vs. graded index) may be the same or different for any combination of the two or more cores. Differences in α and $\Delta_1$, $\Delta_2$, and $\Delta_3$ are achievable through differences in composition, dopant concentration, spatial distribution of dopant, and/or dopant type. Differences in $r_1$, $r_2$, and $r_3$ are achievable by controlling the thicknesses of regions in a preform corresponding to the core region, inner cladding region, and/or depressed index cladding region.

The relative refractive index profiles of the core regions and cladding regions, and the spacing between centerlines of the cores of the multicore optical fiber are selected to minimize crosstalk between cores. As used herein, crosstalk refers to transfer of optical signal intensity from one core to another core. Crosstalk is facilitated by overlap of the evanescent field of an optical signal in one core with a cladding region or core region of another core. Crosstalk is also facilitated by overlap of the evanescent field of an optical signal in one core with the evanescent field of an optical signal in another core in a cladding region between the two cores.

Figure 10:
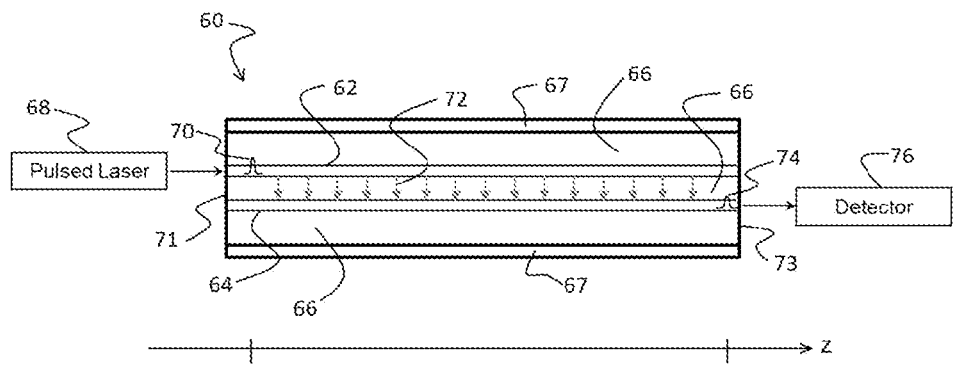
FIG. 10 depicts crosstalk in a multicore glass fiber.

Crosstalk is schematically depicted in FIG. 10, which shows multicore glass fiber 60 having cores 62 and 64. Cores 62 and 64 include embodiments having any of the core regions and dedicated cladding regions described herein (details not shown in FIG. 10). Cores 62 and 64 are surrounded by common interior cladding 66 and common exterior cladding 67. Pulsed laser 68 launches primary signal 70 into core 62 at input end 71 of multicore glass fiber 60. As primary signal 70 propagates along core 62, crosstalk can occur and a portion of primary signal 70 can be transferred to core 64. The transfer of optical signal is depicted as transfer signal 72 and leads to production of crosstalk signal 74 in core 64. Crosstalk signal 74 propagates through core 64 and is detected by detector 76 at output end 73 of multicore glass fiber 60. Crosstalk leads to two undesirable effects in multicore fibers. First, crosstalk leads to a reduction of the power of primary signal 70 detected for core 62 at output end 73 of multicore glass fiber 60. Second, if a secondary signal (not shown in FIG. 10) is launched into core 64 at input end 71 of multicore glass fiber 60, crosstalk signal 74 from core 62 interferes or mixes with the secondary signal as it propagates through core 64, causing distortions or errors in the detection of the secondary signal as it exits core 64 at the output end 73 of multicore glass fiber 60. It is recognized that back crosstalk from core 64 to core 62 may occur so that transfer signal 72 corresponds to the net transfer of optical signal from core 62 to core 64 in the crosstalk process. For weak coupling, the back crosstalk is negligible.

To maintain purity of the optical signals launched into the different cores of a multicore glass fiber, it is preferably to configure the multicore optical fiber to provide a low degree of crosstalk (weak coupling) between cores. The degree of crosstalk is a measure of the power of the crosstalk signal relative to the power of the signal from which it originates (e.g. the power of crosstalk signal 74 relative to primary signal 70). As used herein, degree of crosstalk is normalized to the distance traversed by the crosstalk signal and the primary signal in the direction of propagation of the optical signal (see Eq. (7) below). Degree of crosstalk is expressed herein in units of dB/km, or dB/10 km, or dB/100 km.

By way of example, the direction of propagation of primary signal 70 and crosstalk signal 74 shown in FIG. 10 is the z-direction. The z-direction is parallel to the centerlines of cores 62 and 64 and is oriented in the direction from the input (launch end) to the output (detection end) of the multicore glass fiber. At each z location over a distance of $\Delta z$, crosstalk occurs through transfer of a portion of primary signal 70 from core 62 to core 64 to provide crosstalk signal 74. The crosstalk is depicted as transfer signal 72. If the power of crosstalk signal 74 is $P_2$ at location $z > z_1$ and the power of primary signal 70 at location $z_1$ is $P_1$, the degree of crosstalk at location z in a linear scale is given as:

$$\text{Degree of Crosstalk }(z) = \frac{P_2/P_1}{z - z_1} \quad (7)$$

and the degree of crosstalk in a logarithmic scale is given as:

$$\text{Degree of Crosstalk }(z)(\text{in dB}) = 10\log\left(\frac{P_2/P_1}{z - z_1}\right) \quad (8)$$

Note that the power of crosstalk signal 74 increases linearly with the distance z only in the linear scale (Eq. (7)) and not in the logarithmic scale (Eq. (8)). For convenience, we use the logarithmic scale. When using Eq. (8), we express z and $z_1$ in km (kilometers) and the degree of crosstalk as dB/km.

For a fiber of arbitrary length L (expressed in units of km), the degree of crosstalk in dB normalized to the length L is calculated by $$\text{Degree of Crosstalk }[\text{dB}/L] = \text{Degree of Crosstalk}\left(\frac{\text{dB}}{\text{km}}\right) + 10\log L \quad (9)$$

In Eq. (9), the term "Degree of Crosstalk (dB/km)" refers to the degree of crosstalk computed from Eq. (8) for a fiber length of 1 km. Application of Eq. (9) is now described. If, for example, the power $P_2$ of crosstalk signal 74 is 0.001% of the power $P_1$ of primary signal 70 for a 1 km separation ($z-z_1$) between crosstalk signal 74 and primary signal 70, the degree of crosstalk is −50 dB/km (Eq. (8)). If we apply this degree of crosstalk to a 1 m long fiber segment, the degree of crosstalk computed from Eq. (9) is −80 dB/$10^{-3}$ km, which is equivalent to −80 dB/m. If we apply this degree of crosstalk to a 100 km long fiber segment, the degree of crosstalk computed from Eq. (9) is −30 dB/100 km.

For the present multicore optical fibers, the degree of crosstalk at 1310 nm between any two cores of the multicore optical fiber is less than −40 dB/km, or less than −45 dB/km, or less than −50 dB/km, or less than −55 dB/km, or less than −60 dB/km, or in the range from −90 dB/km to −40 dB/km, or in the range from −80 dB/km to −45 dB/km, or in the range from −75 dB/km to −50 dB/km.

For the present multicore optical fibers, the degree of crosstalk at 1550 nm between any two cores of the multicore optical fiber is less than −25 dB/km, or less than −35 dB/km, or less than −45 dB/km, or less than −50 dB/km, or less than −55 dB/km, or in the range from −75 dB/km to −25 dB/km, or in the range from −65 dB/km to −30 dB/km, or in the range from −55 dB/km to −35 dB/km.

Configurations of cores in the multicore glass fiber are now described. Relevant considerations in the configuration of cores include relative refractive indices ($\Delta_1$, $\Delta_2$, $\Delta_3$, $\Delta_4$, $\Delta_5$, and minimum and maximum values of each), radial positions of core and cladding regions ($r_1$, $r_2$, $r_3$, $R_4$ and $R_5$), core spacing, and edge spacing.

The relative ordering of relative refractive indices in the relative refractive index profile shown in FIGS. 2 and 3 satisfy the conditions $\Delta_1$ (or $\Delta_{1max}$)>$\Delta_4$>$\Delta_3$ (or $\Delta_{3min}$), $\Delta_1$ (or $\Delta_{1max}$)>$\Delta_2$>$\Delta_3$ (or $\Delta_{3min}$), $\Delta_1$ (or $\Delta_{1max}$)>$\Delta_4$>$\Delta_5$ (or $\Delta_{5min}$), $\Delta_1$ (or $\Delta_{1max}$)>$\Delta_2$>$\Delta_5$ (or $\Delta_{5min}$). The values of $\Delta_2$ and $\Delta_4$ may be equal or either may be greater than the other, but both $\Delta_2$ and $\Delta_4$ are between $\Delta_1$ (or $\Delta_{1max}$) and $\Delta_3$ (or $\Delta_{3min}$) and are also between $\Delta_1$ (or $\Delta_{1max}$) and $\Delta_5$ (or $\Delta_{5min}$). The values of $\Delta_3$ and $\Delta_5$ may be equal or either may be greater than the other, but both $\Delta_3$ and $\Delta_5$ are less than $\Delta_2$ and $\Delta_4$.

The relative ordering of relative refractive indices $\Delta_1$, $\Delta_3$, and $\Delta_4$ in the relative refractive index profiles shown in FIGS. 5 and 6 satisfy the conditions $\Delta_1$ (or $\Delta_{1max}$)>$\Delta_4$>$\Delta_2$ (or $\Delta_{2min}$) and $\Delta_1$ (or $\Delta_{1max}$)>$\Delta_4$>$\Delta_5$ (or $\Delta_{5min}$). The values of $\Delta_2$ and $\Delta_5$ may be equal or either may be greater than the other, but both $\Delta_2$ and $\Delta_5$ are less than $\Delta_4$.

The relative ordering of relative refractive indices $\Delta_1$, $\Delta_4$, and $\Delta_5$ in the relative refractive index profiles shown in FIGS. 8 and 9 satisfy the conditions $\Delta_1$ (or $\Delta_{1max}$)>$\Delta_4$>$\Delta_5$ (or $\Delta_{5min}$).

Each of the plurality of core regions of the multicore glass fiber comprises silica glass. The silica glass is undoped silica glass, updoped silica glass, and/or downdoped silica glass. Updoped silica glass includes silica glass doped with one or more of $GeO_2$, an alkali metal oxide (e.g. $Na_2O$, $K_2O$, $Li_2O$, $Cs_2O$, or $Rb_2O$) or a halogen (e.g. Cl, Br). In embodiments, the concentration of $GeO_2$ in silica glass is from 5 wt % to 22 wt %, or 7 wt % to 15 wt %. Downdoped silica glass includes silica glass doped with one or more of F or B. The concentration of $K_2O$ in certain embodiments of the core regions, expressed in terms of the amount of K, is in the range from 20 ppm-1000 ppm, or 35 ppm-500 ppm, or 50 ppm-300 ppm, where ppm refers to parts per million by weight. Alkali metal oxides other than $K_2O$ are present in amounts corresponding to the equivalent molar amount of $K_2O$ as determined from the amount of K indicated above in other embodiments. The concentration of Cl or Br in some embodiments of the core regions is in the range from 0.5 wt %-6.0 wt %, or in the range from 1.0 wt %-5.5 wt %, or in the range from 1.5 wt %-5.0 wt %, or in the range from 2.0 wt %-4.5 wt %, or in the range from 2.5 wt %-4.0 wt %. The dopant type and/or dopant concentration in different core regions of the multicore glass fiber are the same or different.

In some embodiments, at least one core region of the multicore glass fiber includes an updopant and a downdopant, where the concentration of updopant is highest at the centerline (r=0) and lowest at the core radius $r_1$ and the concentration of downdopant is lowest at the centerline (r=0) and highest at the core radius $r_1$. In such embodiments, the relative refractive index $\Delta_1$ can have a positive value near the centerline (r=0) and decrease to a negative value at the core radius $r_1$.

In some embodiments, the relative refractive index of at least one core region of the plurality of core regions of the multicore glass fiber is described by an α-profile with an α value in the range from 1.5-10, or in the range from 1.7-8.0, or in the range from 1.8-6.0, or in the range from 1.9-5.0, or in the range from 2.0-4.0, or in the range from 10-50, or in the range from 11-40, or in the range from 12-30. As the value of α increases, the relative refractive profile more closely approaches a step-index profile. For purposes of the present disclosure, relative refractive index profiles with values of α≥10 are regarded as step-index profiles and relative refractive index profiles with values of α<10 are regarded as graded-index profiles.

For purposes of the present disclosure, the outer radius $r_1$ of each core of the multicore optical fiber is defined as the radial coordinate at which the relative refractive index $\Delta_1$ has decreased from a maximum value $\Delta_{1max}$ to $\Delta_2$. The outer radius $r_1$ of each of the core regions of the multicore glass fiber is in the range from 3.0 μm-9.0 μm, or in the range from 3.0 μm-8.0 μm, or in the range from 3.0 μm-7.0 μm, or in the range from 3.5 μm-6.5 μm.

The relative refractive index $\Delta_1$ or $\Delta_{1max}$ of each of the core regions of the multicore glass fiber is in the range from 0.10%-2.0%, or in the range from 0.20%-1.5%, or in the range from 0.30%-1.0%, or in the range from 0.40%-0.80%, or in the range from 0.20%-0.80%, or in the range from 0.30%-0.60%.

A difference $\Delta_{1,1}-\Delta_{1,2}$ between core region 1 and core region 2 of a multicore glass fiber is less than 0.25%, or less than 0.20%, or less than 0.15%, or less than 0.10%, or less than 0.05%, or 0.00%, or in the range from 0.01%-0.25%, or in the range from 0.05%-0.25%, or in the range from 0.05%-0.20%. A magnitude of a difference $\Delta_{1,1}-\Delta_{1,2}$ between core region 1 and core region 2 of a multicore glass fiber is less than 0.25%, or less than 0.20%, or less than 0.15%, or less than 0.10%, or less than 0.05%, or in the range from 0.01%-0.25%, or in the range from 0.05%-0.25%, or in the range from 0.05%-0.20%.

A difference $\Delta_{1max,1}-\Delta_{1max,2}$ between core region 1 and core region 2 of a multicore glass fiber is less than 0.25%, or less than 0.20%, or less than 0.15%, or less than 0.10%, or less than 0.05%, or in the range from 0.01%-0.25%, or in the range from 0.05%-0.25%, or in the range from 0.05%-0.20%. A magnitude of a difference $\Delta_{1max,1}-\Delta_{1max,2}$ between core region 1 and core region 2 of a multicore glass fiber is less than 0.25%, or less than 0.20%, or less than 0.15%, or less than 0.10%, or less than 0.05%, or in the range from 0.01%-0.25%, or in the range from 0.05%-0.25%, or in the range from 0.05%-0.20%.

In some embodiments, the relative refractive index of at least one of the plurality of core regions of the multicore glass fiber is described by a step-index profile having a constant or approximately constant value corresponding to $\Delta_{1max}$.

In embodiments in which a core region of a multicore glass fiber is directly adjacent to a dedicated inner cladding region, the dedicated inner cladding region is comprised of undoped silica glass, updoped silica glass, or downdoped silica glass. Updoped silica glass includes silica glass doped with $GeO_2$, an alkali metal oxide (e.g. $Na_2O$, $K_2O$, $Li_2O$, $Cs_2O$, or $Rb_2O$) or a halogen (e.g. Cl, Br). Downdoped silica glass includes silica glass doped with F or B. If doped with an updopant, the average concentration of updopant in the dedicated inner cladding region is less than the average concentration of updopant in the core region. If doped with a downdopant, the average concentration of downdopant in the dedicated inner cladding region is greater than the average concentration of downdopant in the core region.

In embodiments in which at least one core region of the multicore glass fiber is directly adjacent to a dedicated inner cladding region that is directly adjacent to a common interior cladding region, the relative refractive index $\Delta_2$ or $\Delta_{2max}$ or $\Delta_{2min}$ of the dedicated inner cladding region is less than −0.30%, or less than −0.40%, or less than −0.50%, or less than −0.60%, or less than −0.70%, or less than −0.80%, or in the range from −1.1% to −0.10%, or in the range from −0.80% to −0.10%, or in the range from −0.80% to −0.30%, or in the range from −0.80% to −0.40%, or in the range from −0.70% to −0.20%, or in the range from −0.65% to −0.30%, or in the range from −0.60% to −0.30%, or in the range from −0.20% to 0.20%, or in the range from −0.10% to 0.10%, or in the range from −0.05% to 0.05%. The relative refractive index $\Delta_2$ is preferably constant or approximately constant. A difference $\Delta_{1max}-\Delta_2$ (or a difference $\Delta_{1max}-\Delta_{2max}$, or a difference $\Delta_{1max}-\Delta_{2min}$) is greater than 0.10%, or greater than 0.20%, or greater than 0.30%, or greater than 0.50%, or greater than 0.70%, or greater than 1.0%, or in the range from 0.10%-1.5%, or in the range from 0.20%-1.2%, or in the range from 0.30%-1.0%.

In embodiments in which at least one core region of the multicore glass fiber is directly adjacent to a dedicated inner cladding region, the radius $r_2$ of a dedicated inner cladding region is in the range from 4.0 μm-18.0 μm, or in the range from 4.5 μm-16.0 μm, or in the range from 5.0 μm-14.0 μm, or in the range from 4.0 μm-10.0 μm, or in the range from 5.0 μm-9.0 μm, or in the range from 9.0 μm-18.0 μm, or in the range from 10.0 μm-17.0 μm, or in the range from 11.0 μm-16.0 μm. The thickness $r_2-r_1$ of the inner cladding region is in the range from 1.0 μm-14.0 μm, or in the range from 2.0 μm-12.0 μm, or in the range from 3.0 μm-10.0 μm, or in the range from 1.0 μm-5.0 μm, or in the range from 1.5 μm-4.5 μm, or in the range from 2.0 μm-4.0 μm, or in the range from 8.0 μm-14.0 μm, or in the range from 8.5 μm-13.5 μm, or in the range from 9.0 μm-13.0 μm.

In embodiments in which at least one core region of the multicore glass fiber is directly adjacent to a dedicated inner cladding region, the value of $\Delta_2$ (or $\Delta_{2max}$) for dedicated inner cladding regions of different core regions is the same or different.

In embodiments in which at least one core region of the multicore glass fiber is directly adjacent to a dedicated inner cladding region, the value of $r_2$ for dedicated inner cladding regions of different core regions is the same or different.

In embodiments in which at least one core region of the multicore glass fiber is directly adjacent to a dedicated inner cladding region that is adjacent to a dedicated depressed index cladding region that is directly adjacent to a common interior cladding region, the dedicated depressed index cladding region comprises downdoped silica glass. The preferred downdopant is F. The concentration of F is in the range from 0.1 wt %-2.5 wt %, or in the range from 0.25 wt %-2.25 wt %, or in the range from 0.3 wt %-2.0 wt %.

In embodiments in which at least one core region of the multicore glass fiber is directly adjacent to a dedicated inner cladding region that is directly adjacent to a common interior cladding region, the dedicated inner cladding region comprises downdoped silica glass. The preferred downdopant is F. The concentration of F is in the range from 0.1 wt %-2.5 wt %, or in the range from 0.25 wt %-2.25 wt %, or in the range from 0.3 wt %-2.0 wt %.

In embodiments in which at least one core region is directly adjacent to a dedicated inner cladding region that is directly adjacent to a dedicated depressed index cladding region, the relative refractive index $\Delta_3$ or $\Delta_{3min}$ is less than −0.30%, or less than −0.40%, or less than −0.50%, or less than −0.60%, or less than −0.70%, or less than −0.80%, or in the range from −1.1% to −0.10%, or in the range from −0.80% to −0.10%, or in the range from −0.80% to −0.30%, or in the range from −0.80% to −0.40%, or in the range from −0.20% to −0.70%, or in the range from −0.30% to −0.60%. The relative refractive index $\Delta_3$ is preferably constant or approximately constant. A difference $\Delta_{1max}-\Delta_3$ (or a difference $\Delta_{1max}-\Delta_{3min}$, or a difference $\Delta_1-\Delta_3$, or a difference $\Delta_1-\Delta_{3min}$) is greater than 0.30%, or greater than 0.50%, or greater than 0.80%, or greater than 1.0%, or in the range from 0.30%-2.0%, or in the range from 0.40%-1.7%, or in the range from 0.50%-1.4%. A difference $\Delta_2-\Delta_3$ (or a difference $\Delta_2-\Delta_{3min}$, or a difference $\Delta_{2max}-\Delta_3$, or a difference $\Delta_{2max}-\Delta_{3min}$) is greater than 0.20%, or greater than 0.35%, or greater than 0.50%, or in the range from 0.20%-0.90%, or in the range from 0.30%-0.80%.

In embodiments in which at least one core region is directly adjacent to a dedicated inner cladding region that is directly adjacent to a dedicated depressed index cladding region, the inner radius of the dedicated depressed index cladding region is $r_2$ and has the values specified above. The outer radius $r_3$ of the dedicated depressed index cladding region is in the range from 7.0 μm-20.0 μm, or in the range from 8.5 μm-18.0 μm, or in the range from 10.0 μm-16.0 μm. The thickness $r_3-r_2$ of the dedicated depressed index cladding region is in the range from 1.0 μm-10.0 μm, or in the range from 1.5 μm-9.0 μm, or in the range from or in the range from 2.0 μm-8.0 μm, or in the range from 3.0 μm-7.0 μm.

In embodiments in which at least one core region of the multicore glass fiber is directly adjacent to a dedicated inner cladding region that is directly adjacent to a dedicated depressed index cladding region, the value of $r_3$ for dedicated depressed index cladding regions of different core regions is the same or different.

In embodiments in which at least one core region of the multicore glass fiber is directly adjacent to a dedicated inner cladding region that is directly adjacent to a dedicated depressed index cladding region, the value of $\Delta_3$ (or $\Delta_{3min}$) for dedicated depressed index cladding regions of different core regions is the same or different.

In embodiments in which at least one core region is directly adjacent to a dedicated depressed index cladding region, the relative refractive index $\Delta_3$ or $\Delta_{3min}$ is in the range from −0.10% to −0.80%, or in the range from −0.20% to −0.70%, or in the range from −0.30% to −0.60%.

In embodiments in which at least one core region is directly adjacent to a dedicated depressed index cladding region, the inner radius of the dedicated depressed index cladding region is $r_1$ and has the values specified above. The outer radius $r_3$ of the dedicated depressed index cladding region is in the range from 7.0 μm-20.0 μm, or in the range from 8.5 μm-18.0 μm, or in the range from 10.0 μm-16.0 μm. A thickness $r_3-r_1$ of the dedicated depressed index cladding region is in the range from 1.0 μm-10.0 μm, or in the range from 1.5 μm-9.0 μm, or in the range from or in the range from 2.0 μm-8.0 μm, or in the range from 3.0 μm-7.0 μm.

In embodiments in which at least one core region of the multicore glass fiber is directly adjacent to a dedicated depressed index cladding region, the value of $r_3$ for dedicated depressed index cladding regions of different core regions is the same or different.

In embodiments in which at least one core region of the multicore glass fiber is directly adjacent to a dedicated depressed index cladding region, the value of $\Delta_3$ (or $\Delta_{3min}$) for dedicated depressed index cladding regions of different core regions is the same or different.

The relative refractive index $\Delta_4$ or $\Delta_{4max}$ of the common interior cladding region is in the range from −0.30% to 0.30%, or in the range from −0.20% to 0.20%, or in the range from −0.10% to 0.10%, or in the range from −0.05% to 0.05%. The relative refractive index $\Delta_4$ is preferably constant or approximately constant.

In embodiments in which a common interior cladding region surrounds and is adjacent to a dedicated depressed index cladding region, which surrounds and is directly adjacent to a dedicated inner cladding region, which surrounds and is directly adjacent to a core region, a difference $\Delta_4-\Delta_3$ (or a difference $\Delta_4-\Delta_{3min}$, or a difference $\Delta_{4max}-\Delta_3$, or a difference $\Delta_{4max}-\Delta_{3min}$) is greater than 0.10%, or greater than 0.20%, or greater than 0.30%, or greater than 0.50%, or in the range from 0.10%-0.80%, or in the range from 0.20%-0.70%.

In embodiments in which a common interior cladding region surrounds and is adjacent to a dedicated depressed index cladding region, which surrounds and is directly adjacent to a dedicated inner cladding region, which surrounds and is directly adjacent to a core region, a difference $\Delta_4-\Delta_5$ (or a difference $\Delta_4-\Delta_{5min}$, or a difference $\Delta_{4max}-\Delta_5$, or a difference $\Delta_{4max}-\Delta_{5min}$) is greater than 0.10%, or greater than 0.20%, or greater than 0.30%, or greater than 0.50%, or in the range from 0.10%-0.80%, or in the range from 0.20%-0.70%

In embodiments in which a common interior cladding region surrounds and is adjacent to a dedicated inner cladding region, which surrounds and is directly adjacent to a core region, a difference $\Delta_4-\Delta_2$ (or a difference $\Delta_4-\Delta_{2min}$, or a difference $\Delta_{4max}-\Delta_2$, or a difference $\Delta_{4max}-\Delta_{2min}$) is greater than 0.10%, or greater than 0.20%, or greater than 0.30%, or greater than 0.50%, or in the range from 0.10%-0.80%, or in the range from 0.20%-0.70%.

In embodiments in which a common interior cladding region surrounds and is adjacent to a dedicated inner cladding region, which surrounds and is directly adjacent to a core region, a difference $\Delta_4-\Delta_5$ (or a difference $\Delta_4-\Delta_{5min}$, or a difference $\Delta_{4max}-\Delta_5$, or a difference $\Delta_{4max}-\Delta_{5min}$) is greater than 0.10%, or greater than 0.20%, or greater than 0.30%, or greater than 0.50%, or in the range from 0.10%-0.80%, or in the range from 0.20%-0.70%.

The outer radius $R_4$ of a common interior cladding region is less than 125.0 μm, or less than 100.0 μm, or less than 80.0 μm, or less than 65.0 μm, or less than 62.5 μm, or less than 60.0 lam, or less than 57.5 μm or less than 55.0 μm, or less than 52.5 μm or in the range from 50.0 μm-125.0 μm, or in the range from 55.0 μm-100.0 μm, or in the range from 57.5 μm-80.0 μm, or in the range from 60.0 μm-70.0 μm, or in the range from 50.0 μm-60.0 μm, or in the range from 52.5 μm-60.0 μm, or in the range from 55.0 μm-60.0 μm. The thickness $R_4-r_2$ of the common interior cladding region (in embodiments in which the common interior cladding region is directly adjacent to an inner cladding region that is directly adjacent to a core region), or the thickness $R_4-r_3$ of the common interior cladding region (in embodiments in which the common interior cladding region is directly adjacent to a dedicated depressed index cladding region that is directly adjacent to a dedicated inner cladding region that is directly adjacent to a core region) of the common interior cladding region is in the range from 20.0 μm-80.0 μm, or in the range from 25.0 μm-70.0 μm, or in the range from 30.0 μm-60.0 μm.

In embodiments in which at least one core region of the multicore glass fiber is directly adjacent to a dedicated inner cladding region that is directly adjacent to a common interior cladding region, the relative refractive index $\Delta_5$ or $\Delta_{5min}$ is less than −0.30%, or less than −0.40%, or less than −0.50%, or less than −0.60%, or less than −0.70%, or less than −0.80%, or in the range from −1.1% to −0.10%, or in the range from −0.80% to −0.10%, or in the range from −0.80% to −0.30%, or in the range from −0.80% to −0.40%, or in the range from −0.20% to −0.70%, or in the range from −0.30% to −0.60%. The relative refractive index $\Delta_5$ is preferably constant or approximately constant. A difference $\Delta_{1max}-\Delta_5$ (or a difference $\Delta_{1max}-\Delta_{5min}$, or a difference $\Delta_1-\Delta_5$, or a difference $\Delta_1-\Delta_{5min}$) is greater than 0.30%, or greater than 0.50%, or greater than 0.80%, or greater than 1.0%, or in the range from 0.30%-2.0%, or in the range from 0.40%-1.7%, or in the range from 0.50%-1.4%.

In embodiments in which at least one core region is directly adjacent to a dedicated inner cladding region that is directly adjacent to a dedicated depressed index cladding region that is directly adjacent to a common interior cladding region, the relative refractive index $\Delta_5$ or $\Delta_{5min}$ is less than −0.30%, or less than −0.40%, or less than −0.50%, or less than −0.60%, or less than −0.70%, or less than −0.80%, or in the range from −1.1% to −0.10%, or in the range from −0.80% to −0.10%, or in the range from −0.80% to −0.30%, or in the range from −0.80% to −0.40%, or in the range from −0.20% to −0.70%, or in the range from −0.30% to −0.60%. The relative refractive index $\Delta_5$ is preferably constant or approximately constant. A difference $\Delta_{1max}-\Delta_5$ (or a difference $\Delta_{1max}-\Delta_{5min}$, or a difference $\Delta_1-\Delta_5$, or a difference $\Delta_1-\Delta_{5min}$) is greater than 0.30%, or greater than 0.50%, or greater than 0.80%, or greater than 1.0%, or in the range from 0.30%-2.0%, or in the range from 0.40%-1.7%, or in the range from 0.50%-1.4%. A difference $\Delta_2-\Delta_5$ (or a difference $\Delta_2-\Delta_{5min}$, or a difference $\Delta_{2max}-\Delta_5$, or a difference $\Delta_{2max}-\Delta_{5min}$) is greater than 0.20%, or greater than 0.35%, or greater than 0.50%, or in the range from 0.20%-0.90%, or in the range from 0.30%-0.80%.

The outer radius $R_5$ of a common exterior cladding region is less than 130.0 μm, or less than 100.0 μm, or less than 80.0 μm, or less than 65.0 μm, or less than 62.5 μm, or less than 60.0 μm, or less than 55.0 μm, or in the range from 50.0 μm-130.0 μm, or in the range from 55.0-100.0 μm, or in the range from 57.5 μm-80.0 μm, or in the range from 60.0 μm-70.0 μm, or in the range from 55.0 μm-65.0 μm, or in the range from 58.0 μm-63.0 μm, or in the range from 61.0 μm-63.0 μm. The thickness $R_5-R_4$ of the common exterior cladding region is in the range from 1.0 μm-30.0 μm, or in the range from 2.0 μm-20.0 μm, or in the range from 3.0 μm-15.0 μm, or in the range from 4.0 μm-12.0 μm, or in the range from 5.0 μm-10.0 μm.

A mode field diameter MFD of at least one core region (in combinations with its cladding regions) of the multicore glass fiber is greater than 7.0 μm, or greater than 7.5 μm, or greater than 8.0 μm, or greater than 8.5 μm, or in the range from 7.0 μm-11.0 μm, or in the range from 7.5 μm-10.0 μm, or in the range from 8.0 μm-9.5 μm at a wavelength of 1310 nm.

A mode field diameter MFD of at least one core region (in combinations with its cladding regions) of the multicore glass fiber is greater than 7.5 μm, or greater than 8.0 μm, or greater than 8.5 nm, or greater than 9.0 μm, or greater than 9.5 μm, or in the range from 7.5 μm-12.0 μm, or in the range from 7.5 μm-11.0 μm, or in the range from 8.0 μm-10.0 μm at a wavelength of 1550 nm.

An effective area $\Delta_{eff}$ of at least one core region (in combinations with its cladding regions) of the multicore glass fiber is greater than 35 μm$^2$, or greater than 40 μm$^2$, or greater than 45 μm$^2$, or greater than 50 μm$^2$, or greater than 55 μm$^2$, or in the range from 35 μm$^2$-90 μm$^2$, or in the range from 40 μm$^2$-80 μm$^2$, or in the range from 45 μm$^2$-75 μm$^2$, or in the range from 50 μm$^2$-70 μm$^2$ at a wavelength of 1310 nm.

An effective area $\Delta_{eff}$ of at least one core region (in combinations with its cladding regions) of the multicore glass fiber is greater than 40 μm$^2$, or greater than 60 μm$^2$, or greater than 70 μm$^2$, or greater than 80 μm$^2$, or in the range from 45 μm$^2$-100 μm$^2$, or in the range from 55 μm$^2$-95 μm$^2$, or in the range from 60 μm$^2$-90 μm$^2$, or in the range from 65 μm$^2$-85 μm$^2$ at a wavelength of 1550 nm.

A core spacing between the centerlines of at least one pair of adjacent cores in the multicore glass fiber is greater than 25 μm, or greater than 30 μm, or greater than 35 μm, or greater than 40 nm, or less than 50 μm, or less than 45 μm, or in the range from 25 μm-50 μm, or in the range from 25 μm-40 μm, or in the range from 30 μm-45 μm, or in the range from 30 μm-40 μm, or in the range from 12 μm-28 μm, or in the range from 15 μm-25 μm. In some embodiments, a core spacing between the centerlines of at least two pairs of adjacent cores in the multicore glass fiber is greater than 25 μm, or greater than 30 μm, or greater than 35 μm, or greater than 40 μm, or less than 50 μm, or less than 45 μm, or in the range from 25 μm-50 μm, or in the range from 25 μm-40 μm, or in the range from 30 μm-45 μm, or in the range from 30 μm-40 μm, or in the range from 12 μm-28 μm, or in the range from 15 μm-25 μm. In some embodiments, a core spacing between the centerlines of at least three pairs of adjacent cores in the multicore glass fiber is greater than 25 μm, or greater than 30 μm, or greater than 35 μm, or greater than 40 μm, or less than 50 μm, or less than 45 μm, or in the range from 25 μm-50 μm, or in the range from 25 μm-40 μm, or in the range from 30 μm-45 μm, or in the range from 30 μm-40 μm, or in the range from 12 μm-28 μm, or in the range from 15 μm-25 μm. In some embodiments, a core spacing between the centerlines of at least four pairs of adjacent cores in the multicore glass fiber is greater than 25 μm, or greater than 30 μm, or greater than 35 μm, or greater than 40 μm, or less than 50 μm, or less than 45 μm, or in the range from 25 µm-50 µm, or in the range from 25 µm-40 µm, or in the range from 30 µm-45 µm, or in the range from 30 µm-40 µm, or in the range from 12 µm-28 µm, or in the range from 15 µm-25 µm. In further embodiments, the core spacing or average core spacing of all pairs of adjacent cores is within the ranges stated in this paragraph.

An edge spacing of at least one core region of the multicore optical fiber is less than 30.0 µm, or less than 27.5 µm, or less than 25.0 µm, or less than 22.5 µm, or less than 20.0 µm, or in the range from 15.0 µm-30.0 µm, or in the range from 17.5 µm-27.5 µm, or in the range from 20.0 µm-25.0 µm. In some embodiments, an edge spacing of each of at least two core regions of the multicore optical fiber is less than 30.0 µm, or less than 27.5 µm, or less than 25.0 µm, or less than 22.5 µm, or less than 20.0 µm, or in the range from 15.0 µm-30.0 µm, or in the range from 17.5 µm-27.5 µm, or in the range from 20.0 µm-25.0 µm. In other embodiments, an edge spacing of each of at least three core regions of the multicore optical fiber is less than 30.0 µm, or less than 27.5 µm, or less than 25.0 µm, or less than 22.5 µm, or less than 20.0 µm, or in the range from 15.0 µm-30.0 µm, or in the range from 17.5 µm-27.5 µm, or in the range from 20.0 µm-25.0 µm. In still other embodiments, an edge spacing of each of at least four core regions of the multicore optical fiber is less than 30.0 µm, or less than 27.5 µm, or less than 25.0 µm, or less than 22.5 µm, or less than 20.0 µm, or in the range from 15.0 µm-30.0 µm, or in the range from 17.5 µm-27.5 µm, or in the range from 20.0 µm-25.0 µm. In still other embodiments, an edge spacing of each of at least five core regions of the multicore optical fiber is less than 30.0 µm, or less than 27.5 µm, or less than 25.0 µm, or less than 22.5 µm, or less than 20.0 µm, or in the range from 15.0 µm-30.0 µm, or in the range from 17.5 µm-27.5 µm, or in the range from 20.0 µm-25.0 µm. In further embodiments, the edge spacing or average edge spacing of all core regions is within the ranges stated in this paragraph.

The degree of crosstalk at 1310 nm between at least one pair of adjacent cores in the multicore optical fiber is less than −40 dB/km, or less than −50 dB/km, or less than −60 dB/km, or in the range from −90 dB/km to −40 dB/km, or in the range from −80 dB/km to −45 dB/km, or in the range from −70 dB/km to −50 dB/km. In some embodiments, the degree of crosstalk at 1310 nm between at least two pairs of adjacent cores in the multicore optical fiber is less than −40 dB/km, or less than −50 dB/km, or less than −60 dB/km, or in the range from −90 dB/km to −40 dB/km, or in the range from −80 dB/km to −45 dB/km, or in the range from −70 dB/km to −50 dB/km. In other embodiments, the degree of crosstalk at 1310 nm between at least three pairs of adjacent cores in the multicore optical fiber is less than −40 dB/km, or less than −50 dB/km, or less than −60 dB/km, or in the range from −90 dB/km to −40 dB/km, or in the range from −80 dB/km to −45 dB/km, or in the range from −70 dB/km to −50 dB/km. In still other embodiments, the degree of crosstalk at 1310 nm between at least four pairs of adjacent cores in the multicore optical fiber is less than −40 dB/km, or less than −50 dB/km, or less than −60 dB/km, or in the range from −90 dB/km to −40 dB/km, or in the range from −80 dB/km to −45 dB/km, or in the range from −70 dB/km to −50 dB/km. In further embodiments, the degree of crosstalk or average degree of crosstalk at 1310 nm between all pairs of adjacent cores is within the ranges stated in this paragraph.

The degree of crosstalk at 1550 nm between at least one pair of adjacent cores in the multicore optical fiber is less than −30 dB/km, or less than −40 dB/km, or less than −50 dB/km, or in the range from −80 dB/km to −30 dB/km, or in the range from −70 dB/km to −35 dB/km, or in the range from −60 dB/km to −40 dB/km. In some embodiments, the degree of crosstalk at 1550 nm between at least two pairs of adjacent cores in the multicore optical fiber is less than −30 dB/km, or less than −40 dB/km, or less than −50 dB/km, or in the range from −80 dB/km to −30 dB/km, or in the range from −70 dB/km to −35 dB/km, or in the range from −60 dB/km to −40 dB/km. In other embodiments, the degree of crosstalk at 1550 nm between at least three pairs of adjacent cores in the multicore optical fiber is less than −30 dB/km, or less than −40 dB/km, or less than −50 dB/km, or in the range from −80 dB/km to −30 dB/km, or in the range from −70 dB/km to −35 dB/km, or in the range from −60 dB/km to −40 dB/km. In still other embodiments, the degree of crosstalk at 1550 nm between at least four pairs of adjacent cores in the multicore optical fiber is less than −30 dB/km, or less than −40 dB/km, or less than −50 dB/km, or in the range from −80 dB/km to −30 dB/km, or in the range from −70 dB/km to −35 dB/km, or in the range from −60 dB/km to −40 dB/km. In further embodiments, the degree of crosstalk or average degree of crosstalk at 1550 nm between all pairs of adjacent cores is within the ranges stated in this paragraph.

In one embodiment, a coating is applied to the outer surface of a common outer cladding region. The coatings are formed from curable coating compositions. Curable coating compositions include one or more curable components. As used herein, the term "curable" is intended to mean that the component, when exposed to a suitable source of curing energy, includes one or more curable functional groups capable of forming covalent bonds that participate in linking the component to itself or to other components of the coating composition. The product obtained by curing a curable coating composition is referred to herein as the cured product of the composition or as a coating. The cured product is preferably a polymer. The curing process is induced by energy. Forms of energy include electromagnetic radiation or thermal energy.

A curable component includes one or more curable functional groups. A curable component with only one curable functional group is referred to herein as a monofunctional curable component. A curable component having two or more curable functional groups is referred to herein as a multifunctional curable component. Multifunctional curable components can introduce crosslinks into the polymeric network that forms during the curing process. Multifunctional curable components may also be referred to herein as "crosslinkers" or "curable crosslinkers". Curable components include curable monomers and curable oligomers. Examples of functional groups that participate in covalent bond formation during the curing process are acrylate groups and methacrylate groups.

The coating preferably includes a primary coating surrounding and directly adjacent to a common outer cladding region and a secondary coating surrounding and directly adjacent to the primary coating. The secondary coating is a harder material (higher Young's modulus) than the primary coating and is designed to protect the multicore glass fiber from damage caused by abrasion or external forces that arise during processing, handling, and installation of the multicore optical fiber. The primary coating is a softer material (lower Young's modulus) than the secondary coating and is designed to buffer or dissipates stresses that result from forces applied to the outer surface of the secondary coating. Dissipation of stresses within the primary coating attenuates the stress and minimizes the stress that reaches the multicore glass fiber. The primary coating is especially important in dissipating stresses that arise when the multicore optical fiber is bent. The multicore optical fiber may also include a tertiary coating that surrounds and is directly adjacent to the secondary coating. The tertiary coating may include pigments, inks or other coloring agents to mark the optical fiber for identification purposes and typically has a Young's modulus similar to the Young's modulus of the secondary coating.

Primary and secondary coatings are typically formed on the draw by applying a curable coating composition to the multicore glass fiber as a viscous liquid and curing. In a continuous optical fiber manufacturing process, a glass fiber is drawn from a heated preform and sized to a target diameter. The glass fiber is then cooled and directed to a coating system that applies a liquid primary coating composition to the glass fiber. Two process options are viable after application of the liquid primary coating composition to the glass fiber. In one process option (wet-on-dry process), the liquid primary coating composition is cured to form a solidified primary coating, the liquid secondary coating composition is applied to the cured primary coating, and the liquid secondary coating composition is cured to form a solidified secondary coating. In a second process option (wet-on-wet process), the liquid secondary coating composition is applied to the liquid primary coating composition, and both liquid coating compositions are cured simultaneously to provide solidified primary and secondary coatings. After the fiber exits the coating system, the fiber is collected and stored at room temperature. Collection of the fiber typically entails winding the fiber on a spool and storing the spool.

The primary coating is a cured product of a radiation-curable primary coating composition that includes an oligomer, a monomer, a photoinitiator and, optionally, an additive.

The oligomer preferably includes a polyether urethane diacrylate compound and a di-adduct compound. In one embodiment, the polyether urethane diacrylate compound has a linear molecular structure. In one embodiment, the oligomer is formed from a reaction between a diisocyanate compound, a polyol compound, and a hydroxy acrylate compound, where the reaction produces a polyether urethane diacrylate compound as a primary product (majority product) and a di-adduct compound as a byproduct (minority product). The reaction forms a urethane linkage upon reaction of an isocyanate group of the diisocyanate compound and an alcohol group of the polyol. The hydroxy acrylate compound reacts to quench residual isocyanate groups that are present in the composition formed from reaction of the diisocyanate compound and polyol compound. As used herein, the term "quench" refers to conversion of isocyanate groups through a chemical reaction with hydroxyl groups of the hydroxy acrylate compound. Quenching of residual isocyanate groups with a hydroxy acrylate compound converts terminal isocyanate groups to terminal acrylate groups. The di-adduct compound is a diacrylate compound formed by reaction of both isocyanate groups of the diisocyanate compound with the hydroxy acrylate compound.

The one or more monomers is/are selected to be compatible with the oligomer, to control the viscosity of the primary coating composition to facilitate processing, and/or to influence the physical or chemical properties of the coating formed as the cured product of the primary coating composition. The monomers include radiation-curable monomers such as ethylenically-unsaturated compounds, ethoxylated acrylates, ethoxylated alkylphenol monoacrylates, propylene oxide acrylates, n-propylene oxide acrylates, isopropylene oxide acrylates, monofunctional acrylates, monofunctional aliphatic epoxy acrylates, multifunctional acrylates, multifunctional aliphatic epoxy acrylates, and combinations thereof.

Representative radiation-curable ethylenically unsaturated monomers include alkoxylated monomers with one or more acrylate or methacrylate groups. An alkoxylated monomer is one that includes one or more alkoxylene groups, where an alkoxylene group has the form —O—R— and R is a linear or branched alkylene group. Examples of alkoxylene groups include ethoxylene (—O—$CH_2$—$CH_2$—), n-propoxylene (—O—$CH_2$—$CH_2$—$CH_2$—), isopropoxylene (—O—$CH_2$—$CH(CH_3)$—, or —O—CH($CH_3$)—$CH_2$—), etc. In some embodiments, the primary coating composition includes an alkoxylated monomer of the form $R_4$—$R_5$—O—$(CH(CH_3)CH_2$—O$)_q$—C(O)CH=$CH_2$, where $R_4$ and $R_5$ are aliphatic, aromatic, or a mixture of both, and q=1 to 10, or $R_4$—O—$(CH(CH_3)CH_2$—O$)_q$—C(O)CH=$CH_2$, where C(O) is a carbonyl group, $R_1$ is aliphatic or aromatic, and q=1 to 10.

Representative examples of monofunctional monomers include ethylenically unsaturated monomers such as lauryl acrylate, ethoxylated nonylphenol acrylate, caprolactone acrylate, phenoxyethyl acrylate, isooctyl acrylate, tridecyl acrylate, isobornyl acrylate, tetrahydrofurfuryl acrylate, stearyl acrylate, isodecyl acrylate, 2-(2-ethoxyethoxy)ethyl acrylate, epoxy acrylate, lauryloxyglycidyl acrylate and phenoxyglycidyl acrylate and combinations thereof. Examples of multifunctional monomers include dipentaerythritol monohydroxy pentaacrylate, methylolpropane polyacrylates with and without alkoxylation such as trimethylolpropane triacrylate and ditrimethylolpropane tetraacrylate, alkoxylated glyceryl triacrylates such as propoxylated glyceryl triacrylate with propoxylation being 3 or greater, and erythritol polyacrylates with and without alkoxylation, such as pentaerythritol tetraacrylate, ethoxylated pentaerythritol tetraacrylate, dipentaerythritol pentaacrylate, tripropyleneglycol diacrylate, propoxylated hexanediol diacrylate, tetrapropyleneglycol diacrylate, pentapropyleneglycol diacrylate, methacrylate analogs of the foregoing, and combinations thereof. Other monomers include N-vinyl amide monomers such as an N-vinyl lactam, or N-vinyl pyrrolidinone, or N-vinyl caprolactam.

The photoinitiator facilitates initiation of the polymerization process associated with the curing of the primary coating composition to form the coating. Photoinitiators include ketonic photoinitiators and/or phosphine oxide photoinitiators. When used in the curing of the coating composition, the photoinitiator is present in an amount sufficient to enable rapid radiation curing. Representative photoinitiators include 1-hydroxycyclohexylphenyl ketone; bis(2,6-dimethoxybenzoyl)-2,4,4-trimethylpentylphosphine oxide; 2,2-dimethoxy-2-phenylacetophenone; bis(2,4,6-trimethylbenzoyl)-phenylphosphine oxide; (2,4,6-trimethylbenzoyl) diphenyl phosphine oxide; ethoxy(2,4,6-trimethylbenzoyl)-phenylphosphine oxide; and combinations thereof.

The curable primary coating composition optionally includes one or more additives. Additives include an adhesion promoter, a strength additive, an antioxidant, a catalyst, a stabilizer, an optical brightener, a property-enhancing additive, an amine synergist, a wax, a lubricant, and/or a slip agent. Some additives operate to control the polymerization process, thereby affecting the physical properties (e.g., modulus, glass transition temperature) of the polymerization product formed from the coating composition. Other additives affect the integrity of the cured product of the primary coating composition (e.g., protect against de-polymerization or oxidative degradation.

The secondary coating is a cured product of a curable secondary coating composition that includes a monomer, a photoinitiator, an optional oligomer, and an optional additive.

The monomers preferably include ethylenically unsaturated compounds. The one or more monomers may be present in an amount of 50 wt % or greater, or in an amount from about 60 wt % to about 99 wt %, or in an amount from about 75 wt % to about 99 wt %, or in an amount from about 80 wt % to about 99 wt % or in an amount from about 85 wt % to about 99 wt %. In one embodiment, the secondary coating is the radiation-cured product of a secondary coating composition that contains urethane acrylate monomers.

Exemplary monofunctional ethylenically unsaturated monomers for the curable secondary coating composition include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, phenoxyethyl acrylate, and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate, tetrahydrofurfuryl acrylate, caprolactone acrylate, and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate; acrylamides such as diacetone acrylamide, isobutoxymethyl acrylamide, N,N'-dimethyl-aminopropyl acrylamide, N,N-dimethyl acrylamide, N,N diethyl acrylamide, and t-octyl acrylamide; vinylic compounds such as N-vinylpyrrolidone and N-vinylcaprolactam; and acid esters such as maleic acid ester and fumaric acid ester. With respect to the long and short chain alkyl acrylates listed above, a short chain alkyl acrylate is an alkyl group with 6 or less carbons and a long chain alkyl acrylate is an alkyl group with 7 or more carbons.

Representative radiation-curable ethylenically unsaturated monomers for the curable secondary composition include alkoxylated monomers with one or more acrylate or methacrylate groups. An alkoxylated monomer is one that includes one or more alkoxylene groups, where an alkoxylene group has the form —O—R— and R is a linear or branched hydrocarbon. Examples of alkoxylene groups include ethoxylene (—O—CH$_2$—CH$_2$—), n-propoxylene (—O—CH$_2$—CH$_2$—CH$_2$—), isopropoxylene (—O—CH$_2$—CH(CH$_3$)—), etc.

Representative multifunctional ethylenically unsaturated monomers for the curable secondary coating composition include, without limitation, alkoxylated bisphenol A diacrylates, such as ethoxylated bisphenol A diacrylate, with the degree of alkoxylation being 2 or greater. The monomer component of the secondary coating composition may include ethoxylated bisphenol A diacrylate with a degree of ethoxylation ranging from 2 to about 30, or propoxylated bisphenol A diacrylate with the degree of propoxylation being 2 or greater; for example, ranging from 2 to about 30; methylolpropane polyacrylates with and without alkoxylation such as ethoxylated trimethylolpropane triacrylate with the degree of ethoxylation being 3 or greater; for example, ranging from 3 to about 30; propoxylated-trimethylolpropane triacrylate with the degree of propoxylation being 3 or greater; for example, ranging from 3 to 30; ditrimethylolpropane tetraacrylate; alkoxylated glyceryl triacrylates such as propoxylated glyceryl triacrylate with the degree of propoxylation being 3 or greater; erythritol polyacrylates with and without alkoxylation, such as pentaerythritol tetraacrylate, ethoxylated pentaerythritol tetraacrylate, and dipentaerythritol pentaacrylate; isocyanurate polyacrylates formed by reacting an appropriate functional isocyanurate with an acrylic acid or acryloyl chloride, such as tris-(2-hydroxyethyl) isocyanurate triacrylate and tris-(2-hydroxyethyl) isocyanurate diacrylate; alcohol polyacrylates with and without alkoxylation such as tricyclodecane dimethanol diacrylate and ethoxylated polyethylene glycol diacrylate with the degree of ethoxylation being 2 or greater; for example, ranging from about 2 to 30; epoxy acrylates formed by adding acrylate to bisphenol A diglycidylether and the like; and single and multi-ring cyclic aromatic or non-aromatic polyacrylates such as dicyclopentadiene diacrylate and dicyclopentane diacrylate.

The optional oligomer present in the radiation-curable secondary coating composition is preferably a compound with urethane linkages. In one aspect, the optional oligomer is a reaction product of a polyol compound, a diisocyanate compound, and a hydroxy-functional acrylate compound. Reaction of the polyol compound with the diisocyanate compound provides a urethane linkage and the hydroxy-functional acrylate compound reacts with isocyanate groups to provide terminal acrylate groups.

The curable secondary coating composition also includes a photoinitiator and optionally includes additives such as an anti-oxidant, an optical brightener, an amine synergist, a tackifier, a catalyst, a carrier or surfactant, and a stabilizer as described above in connection with the curable primary coating composition.

Fiber Draw Process. In a continuous optical fiber manufacturing process, a glass fiber is drawn from a heated preform and sized to a target diameter (typically 125 μm). The glass fiber is then cooled at a controlled rate and directed to a coating system that applies a liquid primary coating composition to the glass fiber. Two process options are viable after application of the liquid primary coating composition to the glass fiber. In one process option (wet-on-dry process), the liquid primary coating composition is cured to form a solidified primary coating, the liquid secondary coating composition is applied to the cured primary coating, and the liquid secondary coating composition is cured to form a solidified secondary coating. In a second process option (wet-on-wet process), the liquid secondary coating composition is applied to the liquid primary coating composition, and both liquid coating compositions are cured simultaneously to provide solidified primary and secondary coatings. After the fiber exits the coating system, the fiber is collected and stored at room temperature. Collection of the fiber typically entails winding the fiber on a spool and storing the spool. Fluid bearing devices may be used to turn and redirect the optical fiber during the draw process.

In some processes, the coating system further applies a tertiary coating composition to the secondary coating and cures the tertiary coating composition to form a solidified tertiary coating. Typically, the tertiary coating is an ink layer used to mark the fiber for identification purposes and has a composition that includes a pigment and is otherwise similar to the secondary coating. The tertiary coating is applied to the secondary coating and cured. The secondary coating has typically been cured at the time of application of the tertiary coating. The primary, secondary, and tertiary coating compositions can be applied and cured in a common continuous manufacturing process. Alternatively, the primary and secondary coating compositions are applied and cured in a common continuous manufacturing process, the coated fiber is collected, and the tertiary coating composition is applied and cured in a separate offline process to form the tertiary coating.

The wavelength of curing radiation is infrared, visible, or ultraviolet (UV). Representative wavelengths include wavelengths in the range from 250 nm to 1000 nm, or in the range from 250 nm to 700 nm, or in the range from 250 nm to 450 nm, or in the range from 275 nm to 425 nm, or in the range from 300 nm to 400 nm, or in the range from 320 nm to 390 nm, or in the range from 330 nm to 380 nm, or in the range from 340 nm to 370 nm. Curing can be accomplished with light sources that include a lamp source (e.g. Hg lamp), an LED source (e.g. a UVLED, visible LED, or infrared LED), or a laser source.

To improve process efficiency, it is desirable to increase the draw speed of the fiber along the process pathway extending from the preform to the collection point. As the draw speed increases, however, the cure speed of coating compositions must increase. The coating compositions disclosed herein are compatible with fiber draw processes that operate at a draw speed greater than 35 m/s, or greater than 40 m/s, or greater than 45 m/s, or greater than 50 m/s, or greater than 55 m/s, or greater than 60 m/s, or greater than 65 m/s, or greater than 70 m/s.

Examples

The examples that follow present calculated results that illustrate a reduction in tunneling loss associated with a common exterior cladding region as described herein as well as model designs of multicore optical fibers that include various numbers and geometric arrangement of cores in a multicore optical fiber.

Tunneling Loss. To illustrate the benefit of including a common exterior cladding region that surrounds and is directly adjacent to a common interior cladding region, the tunneling loss as a function of edge spacing was calculated for cores having two different relative refractive index profiles—Profile 1 and Profile 2. The parameter values associated with each profile are listed in Table 1. Both profiles are step index profiles. Profile 1 has a profile of the type shown in FIG. 5 and Profile 2 has a profile of the type shown in FIG. 2. Each profile included a common exterior cladding region with a radius $R_5$=62.5 μm and a relative refractive index $\Delta_4$=0.0%.

TABLE 1

| Parameter | Profile 1 | Profile 2 |
| --- | --- | --- |
| $\Delta_1$ (%) | 0.34 | 0.34 |
| α | 200 | 200 |
| $r_1$ (μm) | 4.2 | 4.2 |
| $\Delta_2$ (%) | −0.40 | 0 |
| $r_2$ (μm) | 9.2 | 10.2 |
| $\Delta_3$ (%) | — | −0.40 |
| $r_3$ (μm) | — | 15.2 |

Calculations of tunneling loss at a wavelength of 1550 nm were made as a function of edge spacing for cores having Profile 1 and Profile 2 listed in Table 1. The calculation was based on a single core with each profile. For each profile, calculations were made for three configurations: a first configuration having a common interior cladding region (with radius $R_4$=62.5 μm) and no common exterior cladding region, a second configuration having a common interior cladding region and a common exterior cladding region having thickness $R_5-R_4$=5 μm and relative refractive index $\Delta_5$=−0.40%, and a third configuration having a common interior cladding region and a common exterior cladding region having thickness $R_5-R_4$=10 μm and relative refractive index $\Delta_5$=−0.40%.

Figure 11:
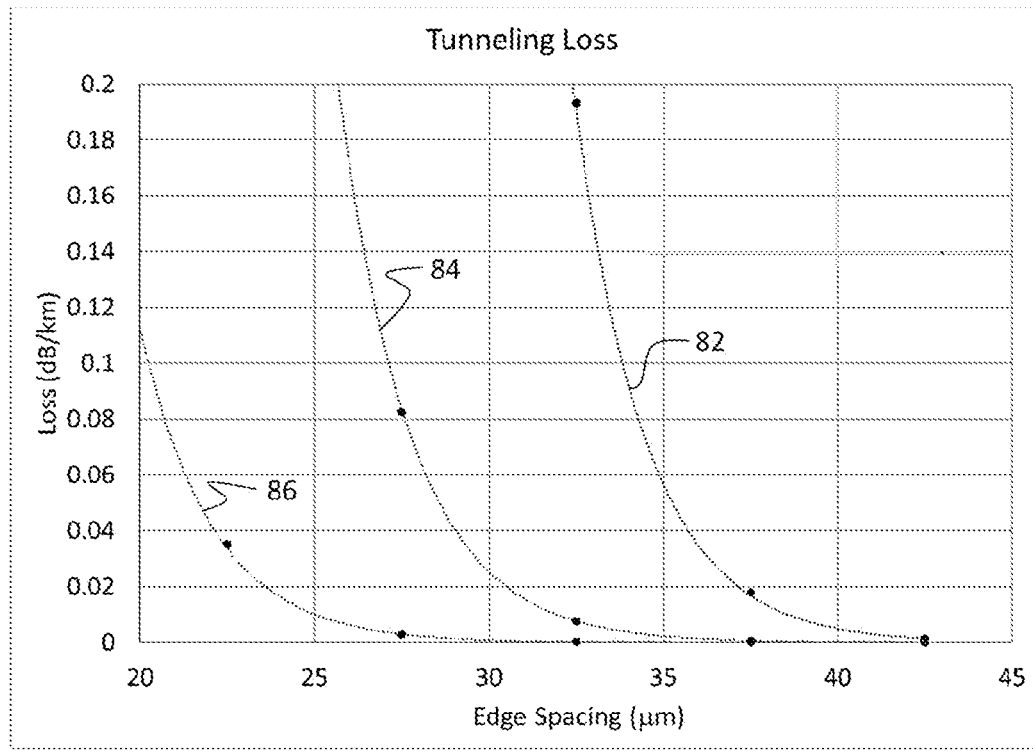
FIG. 11 depicts tunneling loss at a wavelength of 1550 nm for a core region in a multicore optical fiber with and without a common exterior cladding.
Figure 16:
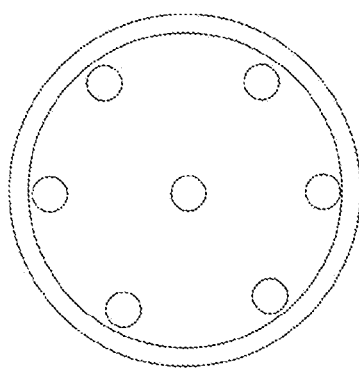
Figure 17:
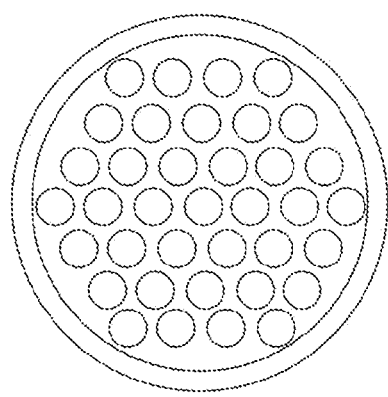

FIGS. 11 and 12 show the calculated tunneling loss for Profile 1 and Profile 2, respectively. Traces 82, 84, and 86 of FIG. 11 show the tunneling loss for the first, second, and third configurations noted above for Profile 1. Traces 92, 94, and 96 of FIG. 12 show the tunneling loss for the first, second, and third configurations noted above for Profile 2. Traces 82 and 92 show that the tunneling loss at a given edge spacing is greatest when no common exterior cladding is present. Inclusion of a common exterior cladding with a thickness of 5 μm led to a significant reduction in tunneling loss (Traces 84 and 94). An even greater reduction in tunneling loss is observed when the thickness of the common exterior cladding is increased to 10 μm (Traces 86 and 96).

An alternative way of interpreting the results shown in FIGS. 11 and 12 is in terms of the edge spacing required to reduce the tunneling loss to a specified level. In FIG. 11, for example, a tunneling loss of 0.1 dB/km requires an edge spacing of about 34 μm when no common exterior cladding is present (Trace 82), an edge spacing of about 27 μm when a common exterior cladding with a thickness of 5 μm is present (Trace 84), and an edge spacing of slightly greater than 20 μm when a common exterior cladding with a thickness of 10 μm is present (Trace 86). In FIG. 12, a tunneling loss of 0.04 dB/km requires an edge spacing of about 27.5 μm when no common exterior cladding is present (Trace 92), an edge spacing of about 23.5 μm when a common exterior cladding with a thickness of 5 μm is present (Trace 94), and an edge spacing of slightly greater than 20 μm when a common exterior cladding with a thickness of 10 μm is present (Trace 96). The results show that cores can be positioned closer to the edge of a multicore optical fiber when a common exterior cladding as described herein is included. As a result, a larger number of cores can be included in multicore fibers of a given diameter without increasing losses due to tunneling when including a common exterior cladding as described herein.

Model Designs. FIGS. 13-17 show illustrative designs of multicore optical fibers consistent with the present disclosure. Each design is illustrated with a cross-sectional view and includes multiple cores (depicted as circles with small radius) surrounded by a common interior cladding (depicted as circles with intermediate radius), which is surrounded by a common exterior cladding (depicted as circles with large radius). Table 2 shows geometric parameters and figure number for each design. Table 3 lists relative refractive indices, and radii of the different regions of each design. Table 4 lists selected optical properties for each design. Each core in each design has a step index profile of the type shown in FIG. 2. Within a design, each core had the same values of α, $r_1$, $r_2$, $r_3$, $\Delta_1$, $\Delta_2$, and $\Delta_3$. The optical properties listed in Table 4 correspond to optical properties of each individual core of each design. The listing "na" means not applicable.

TABLE 2

|  | Design 1 | Design 2 | Design 3 | Design 4 | Design 5 | Design 6 |
|---|---|---|---|---|---|---|
| FIG | 13 | 14 | 14 | 15 | 16 | 17 |
| # of Cores | 8 | 4 | 4 | 8 | 7 | 37 |
| Core Geometry | Ring | 1 × 4 linear | 1 × 4 linear | 2 × 4 linear | Hexagonal | Hexagonal |
| Core Spacing (μm) | 33 | 30 | 30 | 28 | 40 | 35 |
| Edge Spacing (μm) | 20 | 17.5 | 17.5 | 18.2 | 22.5 | 20 |
| Core Diameter (μm) | 125 | 125 | 125 | 125 | 125 | 250 |

TABLE 3

|  | Design 1 | Design 2 | Design 3 | Design 4 | Design 5 | Design 6 |
|---|---|---|---|---|---|---|
| $\Delta_1$ (%) | 0.35 | 0.35 | 0.5 | 0.5 | 0.36 | 0.4 |
| $r_1$ (μm) | 3.25 | 3.25 | 3.6 | 3.6 | 4.9 | 4.6 |
| α | 200 | 200 | 20 | 20 | 200 | 20 |
| $\Delta_2$ (%) | 0.05 | 0.05 | 0 | 0 | 0 | 0 |
| $r_2$ (μm) | 7.95 | 7.95 | 6 | 6 | 7.75 | 7 |
| $\Delta_3$ (%) | −0.698 | −0.698 | −0.40 | −0.40 | −0.53 | −0.40 |
| $r_3$ (μm) | 12.88 | 12.88 | 12 | 12 | 15 | 13 |
| $\Delta_4$ (%) | 0 | 0 | 0 | 0 | 0 | 0 |
| $R_4$ (μm) | 55.5 | 58.0 | 57.0 | 56.5 | 52.5 | 52.5 |
| $\Delta_5$ (%) | −0.7 | −0.7 | −1.0 | −1.0 | −0.5 | −0.5 |
| $R_5$ (μm) | 62.5 | 62.5 | 62.5 | 62.5 | 62.5 | 125 |

TABLE 4

|  | Design 1 | Design 2 | Design 3 | Design 4 | Design 5 | Design 6 |
|---|---|---|---|---|---|---|
| $\lambda_{CC}$ (nm) | 1240 | 1240 | 1220 | 1220 | 1500 | 1500 |
| MFD-1310 nm (μm) | 8.6 | 8.6 | 7.2 | 7.2 | na | na |
| $A_{eff}$-1310 nm (μm²) | 56.6 | 56.6 | 42.1 | 42.1 | na | na |
| Dispersion at 1310 nm (ps/nm − km) | −0.19 | −0.19 | 1.5 | 1.5 | na | na |
| Dispersion Slope at 1310 nm (ps/nm² − km) | 0.0975 | 0.0975 | 0.0907 | 0.0907 | na | na |
| Crosstalk at 1310 nm (dB/km) | −85 | −68 | −83 | −72 | na | na |
| MFD-1550 nm (μm) | 9.6 | 9.6 | 8.0 | 8.0 | 9.8 | 9.3 |
| $A_{eff}$-1550 nm (μm²) | 70.7 | 70.7 | 49.8 | 49.8 | 80.0 | 70.0 |
| Dispersion at 1550 nm (ps/nm − km) | 19.3 | 19.3 | 19.2 | 19.2 | 22.4 | 21.1 |
| Dispersion Slope at 1550 nm (ps/nm² − km) | 0.0694 | 0.0694 | 0.0617 | 0.0617 | 0.0645 | 0.0624 |
| Crosstalk at 1550 nm (dB/km) | −62 | −48 | −60 | −50 | −80 | −71 |

The modelling results indicate that the tunneling decreases approximately exponentially with increasing profile area of the common exterior cladding region. The profile area, $A_P$, is defined in Eq. (9):

$$A_P = |\Delta_5(R_5 - R_4)| \quad (9)$$

where $\Delta_5$ is the relative refractive index of the common exterior cladding region and the difference $R_5-R_4$ is the thickness of the common exterior cladding region. The profile area is expressed in units of % μm and is given in Table 5 for each of the illustrative designs considered in this example.

TABLE 5

|  | Design 1 | Design 2 | Design 3 | Design 4 | Design 5 | Design 6 |
|---|---|---|---|---|---|---|
| $\Delta_5$ (%) | −0.7 | −0.7 | −1 | −1 | −0.5 | −0.5 |
| $R_5 − R_4$ (μm) | 7.0 | 4.5 | 5.5 | 6.0 | 10 | 10 |
| $A_P$ (% μm) | 4.9 | 3.15 | 5.5 | 6.0 | 5.0 | 5.0 |

For low tunneling loss, the profile area $A_P$ is greater than or equal to 2.0% μm, or greater than or equal to 3.0% μm, or greater than or equal to 4.0% μm, or greater than or equal to 5.0% μm, or greater than or equal to 6.0% μm, or in the range from 2.0% μm to 10.0% μm, or in the range from 3.0% μm to 9.0% μm, or in the range from 4.0% μm to 8.0% μm.

Aspect 1 of the description is:

A multicore optical fiber comprising:

a multicore glass fiber, the multicore glass fiber comprising:

a plurality of core regions, each of the plurality of core regions surrounded by and directly adjacent to a dedicated inner cladding region;

a common interior cladding region surrounding the dedicated inner cladding region of each of the plurality of core regions, the common interior cladding region having a relative refractive index $\Delta_4$ and a radius $R_4$; and a common exterior cladding region surrounding the common interior cladding region, the common exterior cladding region having a radius $R_5>R_4$ and a relative refractive index $\Delta_5<\Delta_4$.

Aspect 2 of the description is:

The multicore optical fiber of Aspect 1, wherein the plurality of core regions includes 4 or more core regions.

Aspect 3 of the description is:

The multicore optical fiber of Aspect 1, wherein the plurality of core regions includes 8 or more core regions.

Aspect 4 of the description is:

The multicore optical fiber of any of Aspects 1-3, wherein each of the plurality of core regions has a radius $r_1$ in the range from 3.0 µm-8.0 µm and a relative refractive index $\Delta_1$ in the range from 0.20%-0.80%.

Aspect 5 of the description is:
The multicore optical fiber of any of Aspects 1-4, wherein the dedicated inner cladding region of each of the plurality of core regions has a radius $r_2$ in the range from 9.0 µm-18.0 µm and a relative refractive index $\Delta_2$ in the range from −0.80% to −0.10%.

Aspect 6 of the description is:
The multicore optical fiber of Aspect 5, wherein the common interior cladding region is directly adjacent to the dedicated inner cladding region of each of the plurality of core regions.

Aspect 7 of the description is:
The multicore optical fiber of any of Aspects 1-4, wherein the dedicated inner cladding region of each of the plurality of core regions has a radius $r_2$ in the range from 4.0 µm-10.0 µm and a relative refractive index $\Delta_2$ in the range from −0.10% to 0.10%.

Aspect 8 of the description is:
The multicore optical fiber of Aspect 7, wherein each of the plurality of core regions is further surrounded by a dedicated depressed index cladding region directly adjacent to the dedicated inner cladding region, the dedicated depressed index cladding region having a radius $r_3$ in the range from the range from 7.0 µm-20.0 µm and a relative refractive index $\Delta_3$ in the range from −0.80% to −0.10%.

Aspect 9 of the description is:
The multicore optical fiber of Aspect 8, wherein the common interior cladding region is directly adjacent to the dedicated depressed index cladding region of each of the plurality of core regions.

Aspect 10 of the description is:
The multicore optical fiber of any of Aspects 1-9, wherein the relative refractive index $\Delta_4$ is in the range from −0.30% to 0.30% and the radius $R_4$ is in the range from 50.0 µm-125.0 µm.

Aspect 11 of the description is:
The multicore optical fiber of any of Aspects 1-9, wherein the relative refractive index $\Delta_4$ is in the range from −0.20% to 0.20% and the radius $R_4$ is in the range from 50.0 µm-60.0 µm.

Aspect 12 of the description is:
The multicore optical fiber of any of Aspects 1-11, wherein the relative refractive index $\Delta_5$ is in the range from −0.80% to −0.10%.

Aspect 13 of the description is:
The multicore optical fiber of any of Aspects 1-11, wherein the relative refractive index $\Delta_5$ is less than −0.30%.

Aspect 14 of the description is:
The multicore optical fiber of any of Aspects 1-13, wherein a difference $\Delta_4-\Delta_5$ is greater than 0.10%.

Aspect 15 of the description is:
The multicore optical fiber of any of Aspects 1-13, wherein a difference $\Delta_4-\Delta_5$ is greater than 0.30%.

Aspect 16 of the description is:
The multicore optical fiber of any of Aspects 1-15, wherein the radius $R_5$ is in the range from 50.0 µm-130.0 µm.

Aspect 17 of the description is:
The multicore optical fiber of any of Aspects 1-15, wherein the radius $R_5$ is in the range from 58.0 µm-63.0 µm.

Aspect 18 of the description is:
The multicore optical fiber of any of Aspects 1-17, wherein a difference $R_5-R_4$ is in the range from 1.0 µm-30.0 µm.

Aspect 19 of the description is:
The multicore optical fiber of any of Aspects 1-17, wherein a difference $R_5-R_4$ is in the range from 4.0 µm-12.0 µm.

Aspect 20 of the description is:
The multicore optical fiber of any of Aspects 1-19, wherein the common exterior cladding region has a profile area $A_P$ greater than or equal to 2.0% µm.

Aspect 21 of the description is:
The multicore optical fiber of any of Aspects 1-20, wherein the common exterior cladding region is directly adjacent to the common interior cladding region.

Aspect 22 of the description is:
The multicore optical fiber of any of Aspects 1-21, wherein each of the plurality of core regions has a mode field diameter (MFD) at 1310 nm greater than 7.0 µm.

Aspect 23 of the description is:
The multicore optical fiber of any of Aspects 1-21, wherein each of the plurality of core regions has a mode field diameter (MFD) at 1550 nm greater than 8.0 µm.

Aspect 24 of the description is:
The multicore optical fiber of any of Aspects 1-23, wherein the plurality of core regions comprises at least one pair of adjacent cores having a core spacing greater than 25 µm.

Aspect 25 of the description is:
The multicore optical fiber of any of Aspects 1-23, wherein the plurality of core regions comprises at least one pair of adjacent cores having a core spacing greater than 30 µm.

Aspect 26 of the description is:
The multicore optical fiber of any of Aspects 1-25, wherein an average core spacing of all pairs of adjacent core regions of the plurality of core regions is greater than 25 µm.

Aspect 27 of the description is:
The multicore optical fiber of any of Aspects 1-25, wherein an average core spacing of all pairs of adjacent core regions of the plurality of core regions is greater than 30 µm.

Aspect 28 of the description is:
The multicore optical fiber of any of Aspects 1-27, wherein the plurality of core regions comprises at least one core region having an edge spacing less than 30.0 µm.

Aspect 29 of the description is:
The multicore optical fiber of any of Aspects 1-27, wherein the plurality of core regions comprises at least one core region having an edge spacing less than 25.0 µm.

Aspect 30 of the description is:
The multicore optical fiber of any of Aspects 1-27, wherein the plurality of core regions comprises at least one core region having an edge spacing less than 20.0 µm.

Aspect 31 of the description is:
The multicore optical fiber of any of Aspects 1-30, wherein the plurality of core regions comprises at least two core regions having an edge spacing less than 30.0 µm.

Aspect 32 of the description is:
The multicore optical fiber of any of Aspects 1-30, wherein the plurality of core regions comprises at least two core regions having an edge spacing less than 25.0 µm.

Aspect 33 of the description is:
The multicore optical fiber of any of Aspects 1-30, wherein the plurality of core regions comprises at least two core regions having an edge spacing less than 20.0 µm.

Aspect 34 of the description is:
The multicore optical fiber of any of Aspects 1-33, wherein the plurality of core regions comprises at least three core regions having an edge spacing less than 30.0 µm.

Aspect 35 of the description is:
The multicore optical fiber of any of Aspects 1-33, wherein the plurality of core regions comprises at least three core regions having an edge spacing less than 25.0 µm.

Aspect 36 of the description is:
The multicore optical fiber of any of Aspects 1-33, wherein the plurality of core regions comprises at least three core regions having an edge spacing less than 20.0 µm.

Aspect 37 of the description is:
The multicore optical fiber of any of Aspects 1-36, wherein a crosstalk between each pair of adjacent core regions of the plurality of core regions is less than −60 dB/km at 1310 nm.

Aspect 38 of the description is:
The multicore optical fiber of any of Aspects 1-36, wherein a crosstalk between each pair of adjacent core regions of the plurality of core regions is less than −80 dB/km at 1310 nm.

Aspect 39 of the description is:
The multicore optical fiber of any of Aspects 1-36, wherein a crosstalk between each pair of adjacent core regions of the plurality of core regions is less than −50 dB/km at 1550 nm.

Aspect 40 of the description is:
The multicore optical fiber of any of Aspects 1-36, wherein a crosstalk between each pair of adjacent core regions of the plurality of core regions is less than −70 dB/km at 1550 nm.

Aspect 41 of the description is:
The multicore optical fiber of any of Aspects 1-40, further comprising a coating surrounding and directly adjacent to the common exterior cladding region, the coating comprising a polymer.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A multicore optical fiber comprising:
   a multicore glass fiber, the multicore glass fiber comprising:
      a plurality of core regions, each of the plurality of core regions surrounded by and directly adjacent to a dedicated inner cladding region, the dedicated inner cladding region having a radius $r_2$ in the range from 4.0 μm-10.0 μm and a relative refractive index $\Delta_2$ in the range from −0.10% to 0.10%, each of the plurality of core regions further surrounded by a dedicated depressed index cladding region directly adjacent to the dedicated inner cladding region, the dedicated depressed index cladding region having a radius $r_3$ in the range from the range from 7.0 μm-20.0 μm and a relative refractive index $\Delta_3$ in the range from −0.80% to −0.10%;
      a common interior cladding region surrounding the dedicated depressed index cladding region of each of the plurality of core regions, the common interior cladding region having a relative refractive index $\Delta_4$ and a radius $R_4$; and
      a common exterior cladding region surrounding the common interior cladding region, the common exterior cladding region having a radius $R_5 > R_4$ and a relative refractive index $\Delta_5 < \Delta_4$.

2. The multicore optical fiber of claim 1, wherein the plurality of core regions includes 4 or more core regions.

3. The multicore optical fiber of claim 1, wherein each of the plurality of core regions has a radius $r_1$ in the range from 3.0 μm-8.0 μm and a relative refractive index $\Delta_1$ in the range from 0.20%-0.80%.

4. The multicore optical fiber of claim 1, wherein the dedicated inner cladding region of each of the plurality of core regions has a radius $r_2$ in the range from 9.0 μm-18.0 μm and a relative refractive index $\Delta_2$ in the range from −0.80% to −0.10%.

5. The multicore optical fiber of claim 4, wherein the common interior cladding region is directly adjacent to the dedicated inner cladding region of each of the plurality of core regions.

6. The multicore optical fiber of claim 1, wherein the common interior cladding region is directly adjacent to the dedicated depressed index cladding region of each of the plurality of core regions.

7. The multicore optical fiber of claim 1, wherein the relative refractive index $\Delta_4$ is in the range from −0.30% to 0.30% and the radius $R_4$ is in the range from 50.0 μm-125.0 μm.

8. The multicore optical fiber of claim 1, wherein the relative refractive index $\Delta_5$ is in the range from −0.80% to −0.10%.

9. The multicore optical fiber of claim 1, wherein a difference $\Delta_4 - \Delta_5$ is greater than 0.10%.

10. The multicore optical fiber of claim 1, wherein the radius $R_5$ is in the range from 50.0 μm-130.0 μm.

11. The multicore optical fiber of claim 1, wherein a difference $R_5 - R_4$ is in the range from 4.0 μm-12.0 μm.

12. The multicore optical fiber of claim 1, wherein the common exterior cladding region has a profile area $A_P$ greater than or equal to 2.0% μm.

13. The multicore optical fiber of claim 1, wherein the common exterior cladding region is directly adjacent to the common interior cladding region.

14. The multicore optical fiber of claim 1, wherein each of the plurality of core regions has a mode field diameter (MFD) at 1310 nm greater than 7.0 μm.

15. The multicore optical fiber of claim 1, wherein an average core spacing of all pairs of adjacent core regions of the plurality of core regions is greater than 25 μm.

16. The multicore optical fiber of claim 1, wherein the plurality of core regions comprises at least one core region having an edge spacing less than 20.0 μm.

17. The multicore optical fiber of claim 1, wherein the plurality of core regions comprises at least two core regions having an edge spacing less than 30.0 μm.

18. The multicore optical fiber of claim 1, wherein the plurality of core regions comprises at least three core regions having an edge spacing less than 30.0 μm.

19. The multicore optical fiber of claim 1, wherein a crosstalk between each pair of adjacent core regions of the plurality of core regions is less than −60 dB/km at 1310 nm.

20. The multicore optical fiber of claim 1, wherein a crosstalk between each pair of adjacent core regions of the plurality of core regions is less than −50 dB/km at 1550 nm.

* * * * *

UNITED STATES PATENT AND TRADEMARK OFFICE
CERTIFICATE OF CORRECTION

| | |
|---|---|
| PATENT NO. | : 11,415,743 B2 |
| APPLICATION NO. | : 17/190991 |
| DATED | : August 16, 2022 |
| INVENTOR(S) | : Ming-Jun et al. |

It is certified that error appears in the above-identified patent and that said Letters Patent is hereby corrected as shown below:

In the Claims

In Column 37, Line 53 (approx.), in Claim 1, delete "the range from the range from" and insert -- the range from --.

Signed and Sealed this
Twenty-second Day of November, 2022

*Katherine Kelly Vidal*

Katherine Kelly Vidal
*Director of the United States Patent and Trademark Office*